US009626207B2

(12) United States Patent
Graham et al.

(10) Patent No.: US 9,626,207 B2
(45) Date of Patent: Apr. 18, 2017

(54) MANAGING CONFIGURATION AND SYSTEM OPERATIONS OF A NON-SHARED VIRTUALIZED INPUT/OUTPUT ADAPTER AS VIRTUAL PERIPHERAL COMPONENT INTERCONNECT ROOT TO SINGLE FUNCTION HIERARCHIES

(75) Inventors: Charles S. Graham, Rochester, MN (US); Gregory M. Nordstrom, Pine Island, MN (US); John R. Oberly, III, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

(21) Appl. No.: 13/328,535

(22) Filed: Dec. 16, 2011

(65) Prior Publication Data
US 2013/0160001 A1 Jun. 20, 2013

(51) Int. Cl.
G06F 9/455 (2006.01)
(52) U.S. Cl.
CPC ............ *G06F 9/45558* (2013.01); *G06F 2009/45579* (2013.01)
(58) Field of Classification Search
None
See application file for complete search history.

(56) References Cited

U.S. PATENT DOCUMENTS

| 6,035,346 | A | 3/2000 | Chieng et al. |
|---|---|---|---|
| 6,330,656 | B1 * | 12/2001 | Bealkowski et al. ........... 712/13 |
| 7,120,778 | B2 | 10/2006 | Zimmer |
| 7,743,189 | B2 | 6/2010 | Brown et al. |
| 7,873,068 | B2 | 1/2011 | Klinglesmith et al. |
| 7,934,033 | B2 | 4/2011 | Malwankar et al. |
| 7,979,592 | B1 * | 7/2011 | Pettey et al. ...................... 710/3 |
| 2003/0217168 | A1 | 11/2003 | Adachi et al. |
| 2004/0181625 | A1 | 9/2004 | Armstrong et al. |
| 2005/0223145 | A1 | 10/2005 | Lin et al. |
| 2006/0154725 | A1 | 7/2006 | Glaser et al. |
| 2006/0253619 | A1 * | 11/2006 | Torudbakken et al. ......... 710/31 |
| 2007/0011491 | A1 | 1/2007 | Govindarajan et al. |
| 2008/0147898 | A1 * | 6/2008 | Freimuth ............ G06F 13/4027 710/8 |
| 2008/0168461 | A1 | 7/2008 | Arndt et al. |
| 2008/0216085 | A1 | 9/2008 | Arndt et al. |
| 2008/0270735 | A1 | 10/2008 | Arndt et al. |

(Continued)

FOREIGN PATENT DOCUMENTS

TW 200925878 6/2009

OTHER PUBLICATIONS

Intel, Inc.; "PCI-SIG Single Root I/O Virtualization (SRIOV) Support in Intel Virtualization Technology for Connectivity"; www.intel.dk/jp/software . . . ; 2008.

(Continued)

*Primary Examiner* — Ilwoo Park
(74) *Attorney, Agent, or Firm* — Patterson + Sheridan, LLP

(57) ABSTRACT

A computer implemented method of managing an adapter includes determining that an adapter is assigned to an operating system and generating a single root input/output virtualization (SR-IOV) function associated with the adapter. The SR-IOV function may be correlated to a non-SR-IOV function, and the non-SR-IOV function may be used to modify an operational status of the adapter.

17 Claims, 12 Drawing Sheets

(56) References Cited

U.S. PATENT DOCUMENTS

| | | |
|---|---|---|
| 2009/0089464 A1 | 4/2009 | Lach et al. |
| 2009/0144731 A1 | 6/2009 | Brown et al. |
| 2009/0187694 A1* | 7/2009 | Baba .................. G06F 13/4022 710/316 |
| 2009/0249300 A1 | 10/2009 | Vainer et al. |
| 2009/0249330 A1* | 10/2009 | Abercrombie et al. .......... 718/1 |
| 2009/0276551 A1 | 11/2009 | Brown et al. |
| 2009/0276773 A1* | 11/2009 | Brown et al. .................... 718/1 |
| 2010/0153592 A1 | 6/2010 | Freimuth et al. |
| 2010/0232443 A1* | 9/2010 | Pandey ......................... 370/401 |
| 2010/0251391 A1 | 9/2010 | Adrangi |
| 2010/0290467 A1 | 11/2010 | Eisenhauer et al. |
| 2010/0306416 A1* | 12/2010 | Watkins ............... G06F 9/5011 710/5 |
| 2011/0179413 A1 | 7/2011 | Subramanian et al. |
| 2011/0202702 A1* | 8/2011 | Fan et al. ...................... 710/313 |
| 2012/0089864 A1* | 4/2012 | Tanaka .................. G06F 11/201 714/5.1 |
| 2012/0096192 A1* | 4/2012 | Tanaka .................. G06F 13/385 710/20 |
| 2012/0151472 A1 | 6/2012 | Koch et al. |
| 2013/0111082 A1* | 5/2013 | Baba et al. ..................... 710/38 |
| 2013/0159572 A1 | 6/2013 | Graham et al. |
| 2013/0159686 A1 | 6/2013 | Graham et al. |
| 2013/0160002 A1 | 6/2013 | Graham et al. |

OTHER PUBLICATIONS

Emulex; "Optimizing Virtualized Servers with SR-IOV"; whitepaper; www.emulex.com/artifacts/885edbe . . . ; 2010.
Red Hat, Inc.; "SR-IOV Performance Advantage: Red Hat Enterprise Linux 6 improved virtualized database performance over 23 percent," A Principled Technologies Test Report; www.principledtechnologies.com/RedHat; Nov. 2010.
Gaihong Lian et al.; "Research and implementation of heterogeneous data sharing"; IEEE Intern'l Conference on Computer Mechatronics, Control & EE(CMCE2010); 2010.
Ben-Ami Yassour et al.; "On the DMA Mapping Problem in Direct Device Assignment"; SYSTOR 2010 Proceedings of the 3rd Annual Haifa Experimental Systems Conf; May 2010.
Charles S. Graham et al., U.S. Appl. No. 13/328,595 entitled "Managing Configuration and System Operations of a Shared Virtualized Input/Output Adapter as Virtual Peripheral Component Interconnect Root to Single Function Hierarchies," filed Dec. 16, 2011.
Charles S. Graham et al., U.S. Appl. No. 13/328,640 entitled "Managing Configuration and System Operations of a Non-Shared Virtualized Input/Output Adapter as Virtual Peripheral Component Interconnect Root to Multi-Function Hierarchies," filed Dec. 16, 2011.
Charles S. Graham et al., U.S. Appl. No. 13/328,671 entitled "Managing Configuration and Operation of an Adapter as a Virtual Peripheral Component Interconnect Root to Expansion Read-Only Memory Emulation," filed Dec. 16, 2011.
International Search Report and Written Opinion of the ISA dated Dec. 7, 2012—International Application No. PCT/US2012/059418.
International Search Report dated Dec. 11, 2012, International Application No. PCT/US2012/059685, 2 pages.
International Search Report dated Dec. 11, 2012, International Application No. PCT/US2012/059686, 2 pages.
International Search Report dated Dec. 21, 2012, International Application No. PCT/US2012/059684, 2 pages.
U.S. Appl. No. 13/328,595, Non-Final Office Action dated Mar. 24, 2014, 26 pages.
U.S. Appl. No. 13/328,640; Non-Final Office Action dated Jun. 3, 2014; 24 pages.
Lowe, S., "What is SR-IOV?" Dec. 2, 2009, accessed at blog.scottlowe.org/2009/12/02/what-is-sr-iov, 9 pages.
U.S. Appl. No. 13/328,595; Final Office Action dated Aug. 8 2014; 22 pages.
U.S. Appl. No. 13/328,671; Non-Final Office Action dated Jul. 8, 2014; 19 pages.
U.S. Appl. No. 13/328,595; Non-Final Office Action dated Dec. 11 2014; 19 pages.
U.S. Appl. No. 13/328,640; Final Office Action dated Dec. 18, 2014; 13 pages.
U.S. Appl. No. 13/328,671; Final Office Action dated Dec. 3, 2014; 9 pages.

* cited by examiner

MANAGING CONFIGURATION AND SYSTEM OPERATIONS OF A NON-SHARED VIRTUALIZED INPUT/OUTPUT ADAPTER AS VIRTUAL PERIPHERAL COMPONENT INTERCONNECT ROOT TO SINGLE FUNCTION HIERARCHIES

I. FIELD OF THE DISCLOSURE

The present disclosure relates generally to computer systems, and more particularly, to managing virtual functions that are hosted by a virtualized input/output (I/O) adapter.

II. BACKGROUND

Single Root I/O Virtualization (SR-IOV) is a specification that allows a Peripheral Component Interconnect Express (PCIe) device to appear to be multiple separate physical PCIe devices. SR-IOV enables a virtualization intermediary (VI), such as a hypervisor or virtual input/output (I/O) server operating system, to configure an I/O adapter into a number of virtual functions (VFs). The virtual functions may be assigned to different operating system images (OSIs), or logical partitions (LPARs). The virtual functions belong to a PCI hierarchy and are of a device type that may be undefined in operating system and system firmware. Configuration of the virtual functions may require significant administrator man-hours and system downtime. Association and management of the virtual functions with a PCI adapter or slot location that is subject to PCI adapter maintenance and administrative operations, such as adapter hot plug and dynamic assignment to or from logical partitions, may be undefined in operating systems and system firmware.

III. SUMMARY

In a particular embodiment, a computer implemented method of managing an adapter includes determining that an adapter is assigned to an operating system and generating a single root input/output virtualization (SR-IOV) function associated with the adapter. The SR-IOV function may be correlated to a non-SR-IOV function, and the non-SR-IOV function may be used to modify an operational status of the adapter.

In another particular embodiment, an apparatus includes a processor and a memory to store program code. The program code may be executable by the processor to determine that an adapter is assigned to an operating system and to generate a single root input/output virtualization (SR-IOV) function associated with the adapter. The SR-IOV function may be correlated to a non-SR-IOV function, and the non-SR-IOV function may be used to modify an operational status of the adapter.

In another particular embodiment, a computer program product includes a computer usable medium having computer usable program code embodied therewith. The computer usable program code may be executable by a processor to determine that an adapter is assigned to an operating system and to generate a single root input/output virtualization (SR-IOV) function associated with the adapter. The SR-IOV function may be correlated to a non-SR-IOV function, and the non-SR-IOV function may be used to modify an operational status of the adapter.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
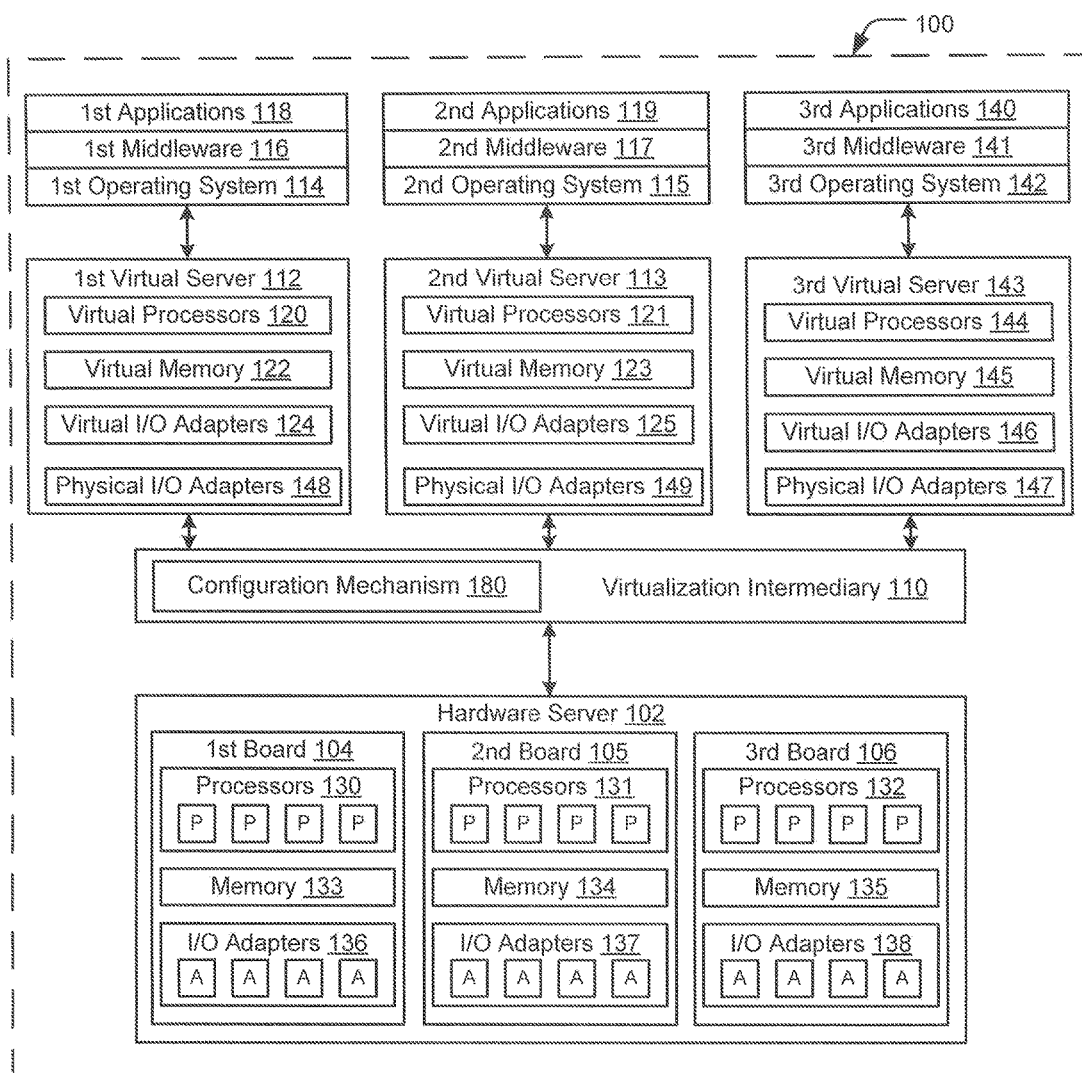
FIG. 1 is a block diagram of a first embodiment of a system to manage a configuration space of an I/O adapter.

In a virtualized computer system, a hardware input/output (I/O) adapter may be capable of providing virtual functions to multiple logical partitions. For example, the hardware I/O adapter may be a single root input/output virtualized (SR-IOV) adapter or a multiple root input/output virtualized (MR-IOV) adapter. A virtualization intermediary (VI), such as a hypervisor, a hosting operating system, or other firmware or software entity within a virtualized computer system acting as a virtualization management agent, may manage the execution of the multiple logical partitions and assign one or more of the virtual functions to particular logical partitions to enable the logical partitions to perform I/O operations.

Each virtual function may have an associated configuration space that is located at a memory of the hardware I/O adapter. The configuration space may include a read-only portion and a read-write portion. For example, the read-only portion may provide information associated with the virtual function, such as a device identifier and a vendor identifier, and information associated with the hardware I/O adapter, such as a number of ports of the hardware I/O adapter and an arrangement of the ports. The read-write portion may include parameters that can be configured (e.g., by a logical partition or by an application executing in the logical partition), such as enabling/disabling memory-mapped I/O (MMIO), enabling/disabling direct memory access (DMA), setting a maximum link speed, enabling/disabling advanced error handling, setting another virtual function parameter or any combination thereof. In a particular embodiment, the configuration space may include one or more registers, such as read-only registers and read-write registers.

The virtualization intermediary may provide an access mechanism to enable a logical partition to access the configuration space that is associated with the virtual function that is assigned to the logical partition. The access mechanism provided by the virtualization intermediary may be a high-level access mechanism that uses lower-level access mechanisms to access the configuration space of each virtual function. For example, the access mechanism provided by the virtualization intermediary may call a configuration space access mechanism of a root complex, an adapter provided configuration mechanism, another access mechanism, or any combination thereof.

A particular embodiment facilitates the implementation and application of Peripheral Component Interconnect Express (PCIe) Single Root I/O Virtualization (SR-IOV) adapter by presenting the SR-IOV adapter and associated virtual functions to system components in a manner that avoids change to the system components. Illustrative such system components may be outside of the virtualization intermediary, such as system or platform management systems, operating systems, system firmware, and I/O device drivers. The virtualization intermediary may detect and initialize physical functions and virtual functions correctly and appropriately.

An embodiment enables a virtualization intermediary to present and operate SR-IOV adapters and virtual functions within system management, operating system, and system firmware components in a manner that substantially conforms to that of non-SR-IOV PCI adapters. SR-IOV technology may be adapted to operating systems and firmware that already support PCI-e adapters in an automatic and inexpensive manner.

An SR-IOV adapter may be virtualized to be shared by multiple OSIs/LPARs within a logically partitioned environment, or may be assigned to one OSI/LPAR as a dedicated adapter. In the shared case, a virtualization intermediary may configure the adapter in SR-IOV-enabled mode and make individual virtual functions available for assignment to an individual operating system or logical partition.

In the case of a dedicated (e.g., non-shared) operating system, the operating system may desire to use the adapter in legacy mode. In legacy mode, the SR-IOV capabilities may not be enabled or used. Another legacy mode scenario may include an adapter enabled for SR-IOV and an operating system that implements a single device driver for the virtual function (or for each virtual function of a plurality of multiple functions). The device driver arrangement may avoid development of a more complex device driver that encompasses both virtual function and adapter physical and management functions.

Where a platform management administers logical partitions and shares SR-IOV adapters as individual virtual functions, an SR-IOV-enabled adapter may be dedicated to a single operating system or logical partition by assigning all of the adapter virtual functions to the operating system or logical partition. This dedicated assignment may allow the operating system or logical partition to provide a virtual function device driver and may delegate the larger adapter configuration and management or service functions to the platform management and virtualization intermediary.

A computing system that is not under such a partition management agent (i.e., a non-managed system) may inherit ownership of all of the PCI devices. The operating system and system firmware may perform all adapter configuration and management operations. The operating system may provide device driver resources to manage the adapter, whether virtualized or not. Further, an operating system may desire to use a non-shared adapter in a legacy mode, i.e., without SR-IOV being enabled. Other operating system instances running on the same logically partitioned system may desire to use the adapter in a non-shared, virtualized mode (e.g., SR-IOV-enabled) when ownership of the adapter is transferred to the operating system or logical partition. An embodiment may enable an SR-IOV adapter to be assigned to, or on a non-managed system to default to be owned by, an operating system or logical partition as wholly owned by that operating system or logical partition in either a virtualized or non-virtualized mode. According to an embodiment, the virtualization intermediary automatically and selectively translates between an SR-IOV function to an emulated PCI-standard function to enable control by the operating system.

Referring to FIG. 1, a block diagram of a first embodiment of a system having functions hosted by an input/output adapter is depicted and generally designated 100. The system may use a virtualization intermediary 110 to selectively and automatically correlate SR-IOV virtual functions to non-SR-IOV functions, such as PCI-standard functions.

More particularly, the system 100 may include a hardware server 102 that is managed by the virtualization intermediary 110, such as a hypervisor. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by the virtualization intermediary 110. Each processor of the processors 130-132 may be a simultaneous multithreading (SMT)-capable processor that is capable of concurrently executing multiple different threads.

The virtualization intermediary 110 may create and manage logical partitions, such as virtual servers 112, 113, 143. A logical partition may be a subset of the resources of the hardware server 102 that is virtualized as a separate virtual server. Each of the virtual servers 112, 113, 143 may have its own set of virtual resources, similar to a physical server. For example, the first virtual server 112 may include virtual processors 120, virtual memory 122, and virtual I/O adapters 124. The second virtual server 113 may include virtual processors 121, virtual memory 123, and virtual I/O adapters 125. The second virtual server 143 may include virtual processors 143, virtual memory 145, and virtual I/O adapters 146. The virtualization intermediary 110 may map the hardware of the hardware server 102 to the virtual servers 112, 113, 143. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. Each of the virtual servers 112, 113, 143 may include a physical I/O adapter 147-149. The physical I/O adapters 147-149 may correspond to I/O adapters 136-138. The virtualization intermediary 110 may manage the selection of portions of the hardware server 102 and their temporary assignment to portions of the virtual servers 112, 113, including assignment of one or a plurality of physical adapters 136-138 to one virtual server.

The virtualization intermediary 110 may provide a configuration mechanism 180 to configure and manage a PCI hierarchy that includes a PCI host bridge and virtual functions. SR-IOV virtual functions may be presented to an operating system 114, 115 as non-IOV functions of a PCI multi-function device. According to another embodiment, the configuration mechanism 180 may not configure the adapters 136-138 in SR-IOV mode, and may instead allow the operating system 114, 115 to operate the adapters 136-138 as legacy PCI adapters.

Figure 2:
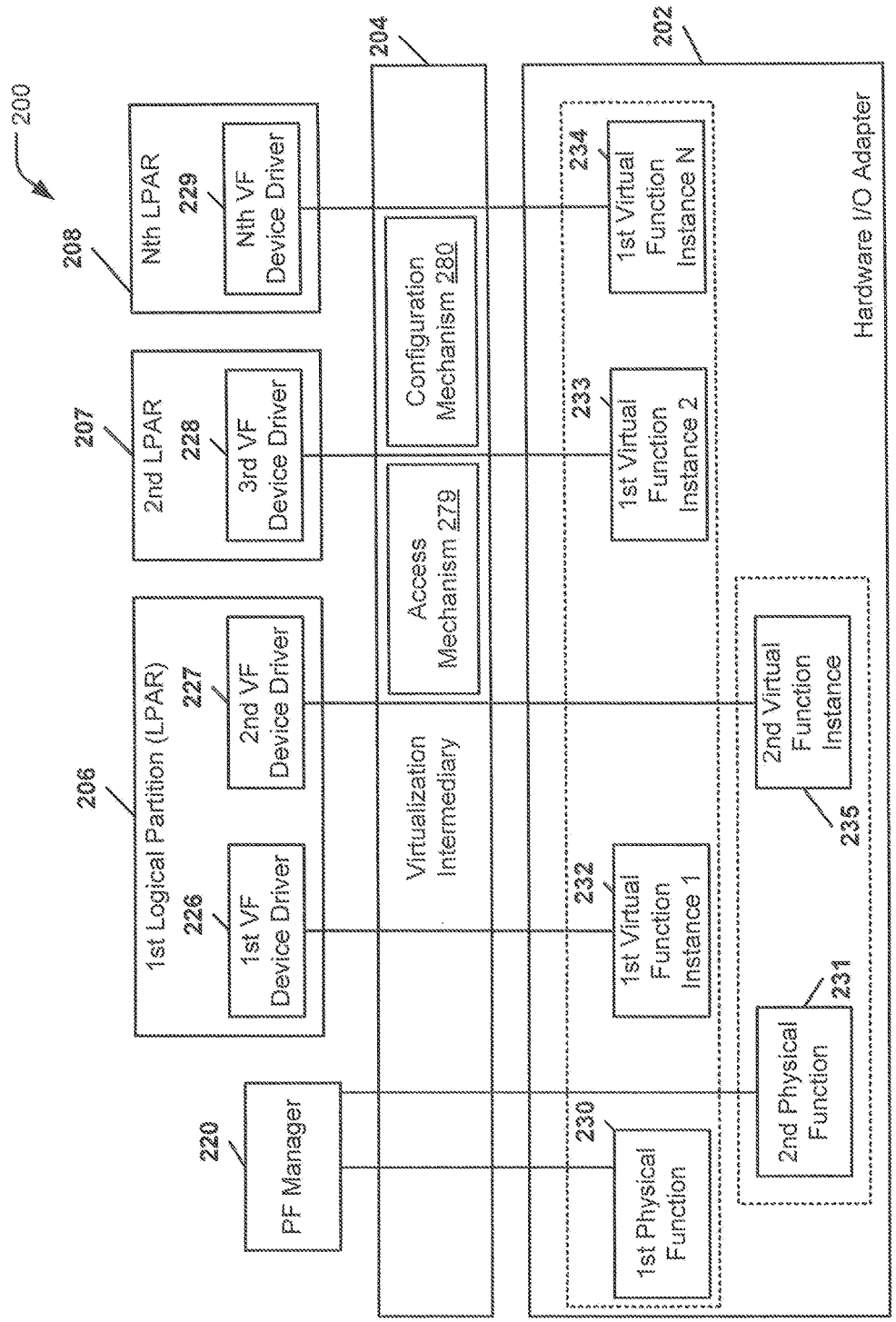
FIG. 2 is a block diagram of a second embodiment of a system to manage a configuration space of an I/O adapter.

Referring to FIG. 2, a block diagram of a second embodiment of a system to manage functions hosted on an I/O adapter is depicted and generally designated 200. In the system 200, a hypervisor, or other virtualization intermediary 204, may enable multiple logical partitions to access virtual functions provided by hardware that includes a hardware I/O adapter 202. For example, the virtualization intermediary 204 may enable a first logical partition 206, a second logical partition 207, and an Nth logical partition 208, to access virtual functions 232-235 that are provided by the hardware I/O adapter 202. To illustrate, the virtualization intermediary 204 may use a first physical function 230 of the hardware I/O adapter 202 to provide a first instance of a first virtual function 232, a second instance of a first virtual function 233, and an Nth instance of a first virtual function 234 to the logical partitions 206-208. The virtualization intermediary 204 may use a second physical function 231 of the hardware I/O adapter 202 to provide a second virtual function 235 to the logical partitions 206-208.

The physical functions 230, 231 may include PCI functions that support single root I/O virtualization capabilities. Each of the virtual functions 232-235 may be associated with one of the physical functions 230, 231 and may share one or more physical resources of the hardware I/O adapter 202.

Software modules, such as a physical function (PF) manager 220, may assist the virtualization intermediary in managing the physical functions 230, 231 and the virtual functions 232-235. For example, a user may specify a particular configuration and the PF manager 220 may configure the virtual functions 232-235 from the physical functions 230, 231 accordingly.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232. The second client virtual I/O 227 may access the second virtual function 235. A third client virtual I/O 228 executing at the second logical partition 207 may access the second instance of the first virtual function 233. An Nth client virtual I/O 229 executing at the Nth logical partition 208 may access the Nth instance of the first virtual function 233.

The virtualization intermediary 204 may assign the first instance of the first virtual function 232 and the first instance of the second virtual function 235 to the first logical partition 206. The virtualization intermediary 204 may provide the first logical partition 206 with two tokens (not shown), such as a first token and a second token, to enable the first logical partition 206 to access the virtual functions 232 and 235. The token may include a group identifier that identifies a physical slot location of the hardware I/O adapter 202 that hosts the virtual functions 232 and 235. The hardware I/O adapter 202 that hosts the virtual functions 232 and 235 may be moved from a first physical slot location to a second physical slot location. After the move, the virtualization intermediary 202 may associate the group identifier with the second physical slot location to enable the virtual functions 232 and 235 to be provided to the first logical partition 206.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function. The virtualization intermediary 204 may provide a configuration mechanism 280 to selectively and automatically associate SR-IOV virtual functions with non-SR-IOV functions, such as PCI-standard functions virtual functions.

Figure 3:
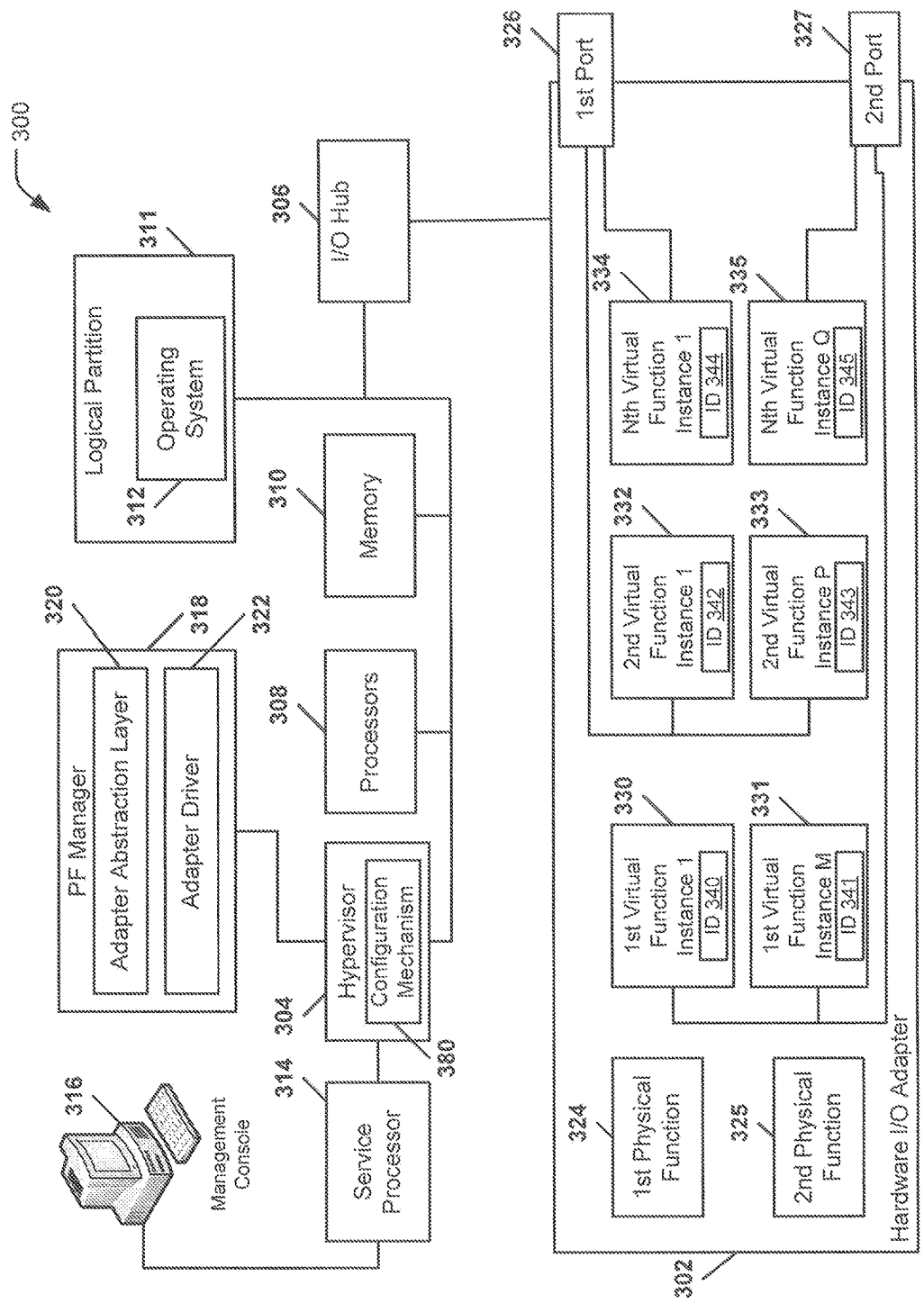
FIG. 3 is a block diagram of a third embodiment of a system to manage a configuration space of an I/O adapter.

Referring to FIG. 3, a block diagram of a third embodiment of a system to emulate SR-IOV functions to an operating system as non-SR-IOV functions is depicted and generally designated 300. In the system 300, a virtualization intermediary (VI) 304 may be coupled to hardware devices, such as a hardware I/O adapter 302, an I/O hub 306, processors 308, and a memory 310. The virtualization intermediary 304 may be coupled to a logical partition 311 that executes an operating system 312. The virtualization intermediary 304 may enable the logical partition 311 to access virtual functions associated with the hardware I/O adapter 302. A physical function (PF) manager 318 may be coupled to the virtualization intermediary 304 to manage the physical functions of the hardware I/O adapter 302. In a particular embodiment, the PF manager 318 may be in a logical partition. A management console 316 may be coupled to the virtualization intermediary 304 via a service processor 314.

The service processor 314 may be a microcontroller that is embedded in a hardware server (e.g., the hardware server 102 of FIG. 1) to enable remote monitoring and management of the hardware server via a management console 316. For example, the management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the management console 316.

The virtualization intermediary 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The virtualization intermediary 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the virtualization intermediary 304. The I/O hub 306 may enable the virtualization intermediary 304 to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The virtualization intermediary 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

Each virtual function (e.g., each of the virtual functions 330-335) may have an associated virtual function identifier (ID). For example, in the system 300, the first instance of the first virtual function 330 may have an associated identifier 340, the Mth instance of the first virtual function 331 may have an associated identifier 341, the first instance of the second virtual function 332 may have an associated identifier 342, the Pth instance of the second virtual function 333 may have an associated identifier 343, the first instance of the Nth virtual function 334 may have an associated identifier 344, and the Qth instance of the Nth virtual function 335 may have an associated identifier 345.

Each virtual function identifier may uniquely identify a particular virtual function that is hosted by the hardware I/O adapter 302. For example, when a message (not shown) is routed to a particular virtual function, the message may include the identifier associated with the particular virtual function. As another example, a token 313 may be provided to the operating system 312 to enable the operating system 312 to access one of the virtual functions 330-335 at the hardware I/O adapter 302. The token 313 may include a configuration mechanism 380 that is associated with the accessed virtual function. For example, the first instance of the first virtual function 330 may be assigned to the operating system 312. The token 313 may be provided to the operating system 312 to access the first instance of the first virtual function 330. The token 313 may include the virtual function identifier 380. The virtual function identifier 380 may comprise the identifier 340 that is associated with the first instance of the first virtual function 330.

The virtualization intermediary 304 may assign one or more of the virtual functions 330-335 to the logical partition 311. For each virtual function that is assigned to the logical partition 311, the virtualization intermediary 304 may provide the logical partition 206 with a token (not shown) to enable the logical partition 311 to access the virtual function. The token may include a group identifier that identifies a physical slot location of the hardware I/O adapter 302 that hosts the assigned virtual functions.

The virtualization intermediary 304 may provide an access mechanism 380 to enable logical partitions (e.g., the logical partition 311) to access configuration space associated with one or more of the virtual functions 330-335. The virtualization intermediary 304 may include an access mechanism 279 to enable logical partitions to access the PCI memory space, PCI DMA space, and interrupt ranges associate with virtual functions. In a legacy or SR-IOV model, the operating system device driver may access to the PCI memory that maps BARs, as well as access to a DMA window that the virtual function can use to DMA to memory, and a range of PCI interrupts the device driver can use to enable the virtual function to signal interrupts. This feature may provide for virtual functions in the same or a similar manner to that of legacy mode adapter function.

Figure 4:
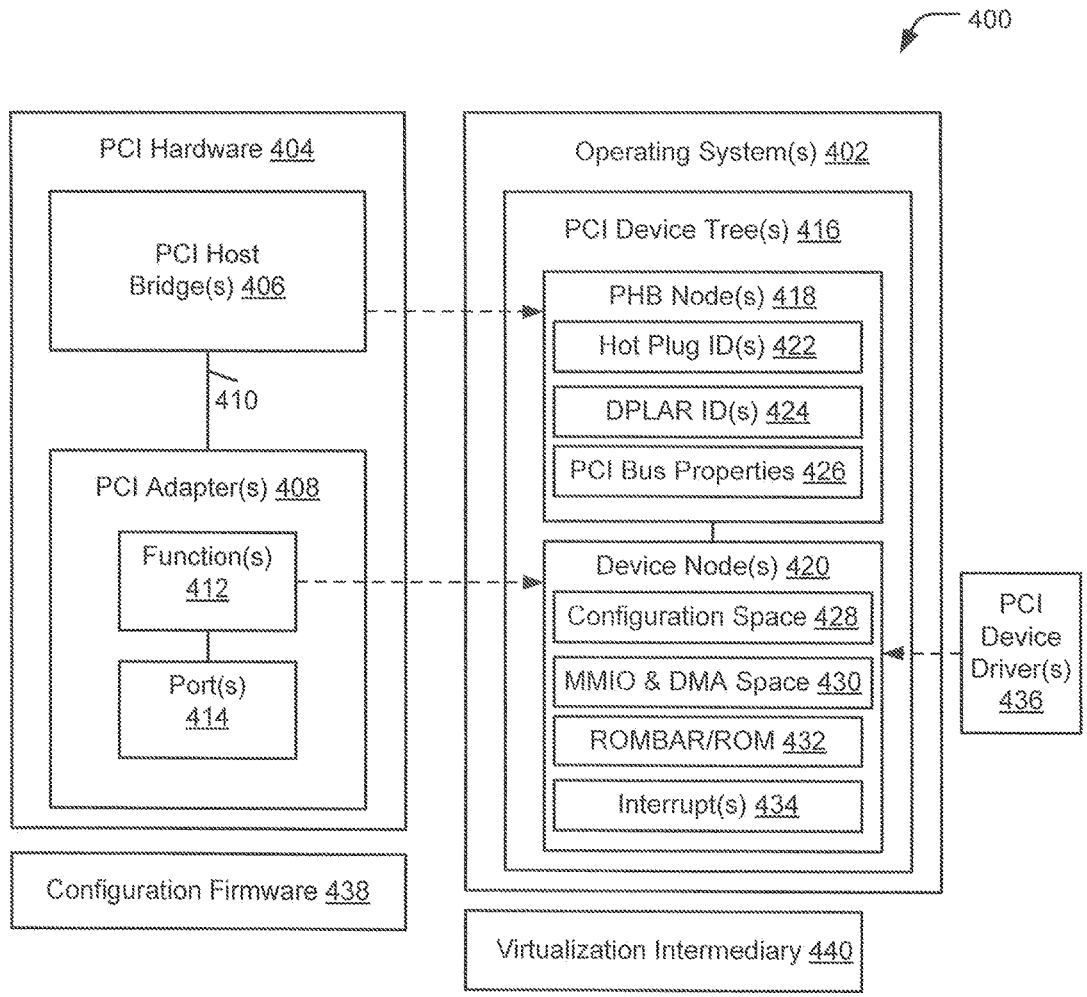
FIG. 4 is a block diagram of an embodiment of a system having an operating system that manages elements of a non-shared, legacy PCI adapter.

FIG. 4 shows a block diagram of an embodiment of a logically partitioned computing system 400 having an operating system 402 configured to manage elements of PCI hardware 404, including a PCI adapter 408. The PCI adapter 408 may be non-shared, e.g., owned by a single operating system 402. The PCI Adapter 408 may be a legacy adapter. The computing system 400 may further include PCI configuration firmware 438 and a virtualization intermediary (VI) 440, such as a hypervisor.

The PCI hardware 404 may include a PCI host bridge (PHB) 406, associated with a PCI-express root port (not shown). The PCI host bridge 406 may be coupled to the PCI adapter 408 via a PCI bus 410 representing a PCIe physical link connection (not shown) between the PCIe root port and a PCI adapter 408. The PCI adapter 408 may include a function 412 and a port 414.

The operating system 402 may include a PCI device tree 416 and a PCI device driver 436. The PCI device tree 416 may include a PCI host bridge node 418 and a device node 420. The PCI host bridge node 418 may include a hot plug identifier (ID) 422, a dynamic logical partitioning (DLPAR) ID 424, and PCI bus properties 426. The device node 420 may include a configuration space 428, memory-mapped I/O (MIMIO) and direct memory access (DMA) space 430, a PCI read only memory base address register/read-only memory (ROMBAR/ROM) space 432, and an interrupt 434.

The PCI host bridge 406 may create an instance of the PCIe bus 410 connected to the PCI adapter 408. The function(s) 412 may be individually addressable in PCI configuration address space. For example, the function(s) 412 may have the same PCI device number and differing PCI function numbers (e.g., ranging from 0 to 7). Alternatively, the PCI adapter 408 may use PCI alternate routing ID (ARI) configuration addressing. Each function 412 may have a unique configuration function number ranging from 0 to 255 at an implied device number of 0. Each function 412 may be associated with a unique physical port 414 within the PCI adapter 408. The physical port 414 may create a connection to an external peripheral I/O interconnect, such as Ethernet, Fiber Channel, or another peripheral device interconnect.

The function(s) 412 may form a device driver programming interface by which the operating system 402 may utilize the PCI device driver 436. The PCI host bridge node(s) 418 may represent the PCI host bridge(s) 406, and the PCI device node(s) 420 may represent each instance of the function(s) within the PCI adapter 408.

The PCI host bridge node 418 may include properties, or functions, descriptive of the PCI host bridge 406. Such properties may include characteristics of the PCIe bus 410 created by that PCI host bridge 406. The characteristics may be used by the operating system 402 to manage the PCI host bridge 406 and by the PCI device driver 436 to perform PCI bus transactions. For example, the PCI host bridge node properties may include an identifier used for a hot plug domain 422 and an identifier for a DLPAR domain 424.

The operating system 402 may utilize the configuration firmware 438 to detect the presence of PCI devices, such as the function(s) 412. For each detected function 412, the configuration firmware 438 may generate a device node 420 associated with the PCI host bridge node 418 of the PCI device tree 416. The device node 420 may include functions, or properties, associated uniquely with the function 412 and used by the operating system 402 to identify the type and programming interface of the function 412. Illustrative such functions may relate to the configuration space 428 and the ROMBAR/ROM space 432. The properties may further be used by the device driver 436 to perform PCI bus transactions specific to that function 412, as well as to properties relating to the MIMIO and DMA space 430, the ROMBAR/ROM space 432, and the interrupts 434.

For each device node 420 within the PCI device tree 416, the operating system 402 may activate an instance of the device driver 436 to control the characteristics of the associated function 412. Data transfer operations may be performed between the operating system 402, the external interconnect, and devices accessed through the corresponding physical port 414.

The hot plug ID 422 of the PCI host bridge node 418 may be used to identify the PCI bus 410 physical connection point, or slot. The slot may be located between the PCI host bridge 406 and the PCI adapter 408. The operating system 402 may use the hot plug ID 422 when adapter a power-off or power-on operation is performed. The operating system 402 may be running and may be in control of the PCI host bridge 406 and the PCI bus 410.

To power-off the adapter 105, the operating system 402 may correlate a hot plug ID of a hot plug power-off/on operation with the hot plug ID 422 of the PCI host bridge node 418. As part of performing the power-off operation, the operating system 402 may first deactivate the device driver(s) 436. As discussed herein, the device driver(s) 436 may be associated with each device node 420, and each device node 420 may be associated with the PCI host bridge node 418.

When powering-on the PCI adapter 105, the configuration firmware 438 associated with the operating system 402 may interrogate each possible PCI configuration address of the PCI bus 410 to detect each function 412. The configuration firmware 438 may construct a device node 420 that is associated with the PCI host bridge node 418. The operating system 402 may create instances of the device driver(s) 436 that are associated with each device node 420. The device driver(s) 436 may control each of the associated functions 412.

The PCI host bridge(s) 406 may be connected individually to PCI slots. A slots may be a connection point at which the PCI adapters 408 may be added at a future time. The configuration firmware 438 may generate the PCI host bridge node(s) 418 of the PCI device tree 416 for each PCI host bridge 406. This generation may occur at an instance where the PCI host bridge 406 is connected to a PCI slot that is empty (e.g., does not have a PCI adapter 408 present).

The PCI adapter 408 may be transferable to different logical partitions using DLPAR. The PCI host bridge node 418 of the PCI device tree 416 may represent the domain of the functions 412 that are transferred, collectively, between logical partitions of the operating system 402. The virtualization intermediary 440 may act as a management agent of a system administrator to automatically associate elements of the PCI hardware 404 with an operating system(s) 402 comprising logical partitions.

The virtualization intermediary 440 may function as a system administrator for DLPAR by removing the PCI adapter 408 from the operating system 402. More specifically, the virtualization intermediary 440 may signal to the operating system 402 to initiate removal of a particular PCI adapter 408 having a DLPAR ID that references a matching DLPAR ID 424 of the operating system 402. As part of removing the PCI adapter 408 from the operating system PCI configuration, the operating system 402 may deactivate the PCI device driver(s) 436 associated with each device node 420 that is associated with that PCI host bridge node 418. The operating system 402 may release control of the PCI host bridge 406 and the PCI adapter 408 to the virtualization intermediary 440.

When adding a PCI adapter 408 to the PCI configuration of an executing operating system 402, the virtualization intermediary 440 may signal the operating system 402 to add the PCI host bridge node 418 to the PCI device tree 416. The virtual PCI host bridge node 418 may correspond to the physical PCI host bridge 406 and to the associated PCIe bus 410. The operating system 402 may invoke the configuration firmware 438 to detect the functions 412 of the PCI adapter 408. The configuration firmware 438 may update the PCI device tree 416 with a device node 420 corresponding to each detected function 412 that is associated with the PCI host bridge node 418 and/or PCIe bus 410. The operating system 402 may create an instance of the PCI device driver 436. The PCI device driver 436 may be associated with each device node 420 in order to control each of the associated functions 412.

Figure 5:
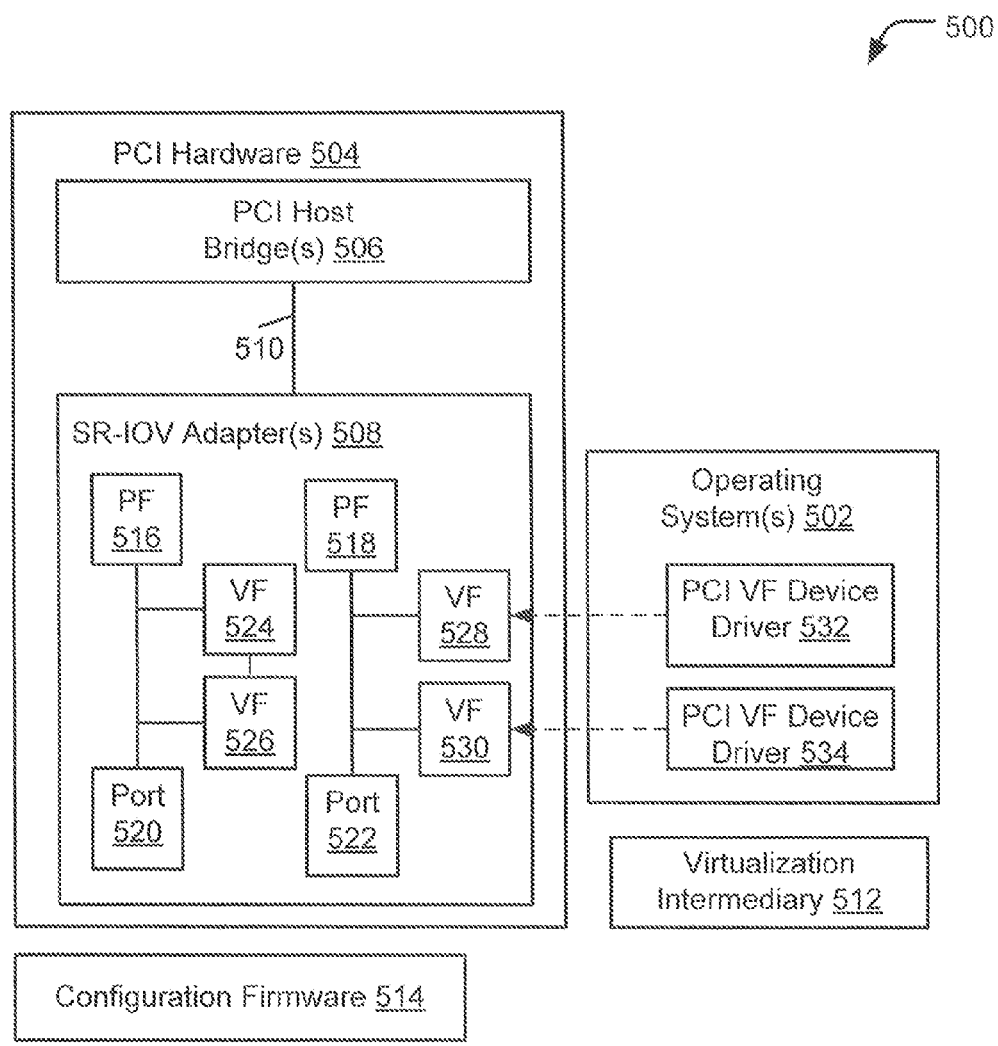
FIG. 5 is a block diagram of an embodiment of a system having an operating system that manages elements of a non-shared, SR-IOV adapter.

FIG. 5 shows a block diagram of an embodiment of a logically partitioned computing system 500 having an operating system 502 configured to manage elements of PCI hardware 504, including an SR-IOV adapter 508. The computing system 500 may further include a virtualization intermediary 512 and configuration firmware 514. In one sense, FIG. 5 illustrates the PCI hierarchy for the SR-IOV adapter 508. According to an embodiment, the virtualization intermediary 512 automatically and selectively maps an SR-IOV function to an emulated PCI-standard function to enable control by the operating system 502.

The PCI hardware 504 may include a PCI host bridge (PHB) 506, associated with a PCIe root port (not shown). The PCI host bridge 506 may be coupled to the SR-IOV adapter 508 via a PCI bus 510, representing a PCIe physical link connection (not shown) between the PCI-express root port and the SR-IOV adapter 508. The SR-IOV adapter 508 may include physical functions (PFs) 516, 518 respectively coupled to ports 520 and 522. The SR-IOV adapter 508 may further include virtual functions (VFs) 524, 526 associated with the physical function 516, and virtual functions 528, 530 associated with the physical function 518. The operating system 502 may include multiple PCI virtual function device drivers 532, 534.

The SR-IOV adapter 508 may present one or more of the physical functions 516, 518 at the PCI bus device 510 across a PCI link. The physical functions 516, 518 may respond to configuration read and write cycles (e.g., at physical functions 516, 518 numbering 0 through 7). Alternatively, the SR-IOV adapter 508 may be designed according to PCI alternate routing ID (ARI) configuration addressing. Each physical function 516, 518 may have a unique configuration function number (e.g., ranging from 0 to 255 at an implied device number of 0). The ports 520, 522 may create a connection to an external peripheral I/O interconnect, such as Ethernet, Fiber Channel, or other peripheral device interconnects.

Each physical function 516, 518 may be further configured by the virtualization intermediary 512 into one or more of the virtual functions 524, 526, 528, 530. An embodiment of the virtualization intermediary 512 may include program code residing within firmware of the computer system 500. An embodiment of the virtualization intermediary 512 may include a hypervisor. The hypervisor may be a component of the computer system firmware or a type of operating system, or program within an operating system, that is a host to the operating systems 502. Another embodiment of the hypervisor may be a PCI manager program within the computer system having access to the SR-IOV adapter 508 by some physical interconnect that may be a PCI link or other physical connection. The PCI manager of an embodiment may be located locally or remotely, e.g., in a separate processor or memory.

Each virtual function 524, 526, 528, 530 may provide a PCI device programming interface that may be controlled by a PCI virtual function device driver 532, 534. The PCI virtual function device drivers 532, 534 may control the virtual functions 524, 526, 528, 530 to perform I/O transactions through the ports 520, 522 on behalf of the operating system 502.

As discussed herein, the virtual functions 524, 526, 528, 530 may be created under physical functions 516, 518, which may be associated with the ports 520, 522. The virtual functions 524, 526, 528, 530 may thus share the physical facilities of the ports 520, 522. The virtual functions 524, 526, 528, 530 may have a limited ability to perform I/O transactions through the ports 520, 522 and may affect the physical states of the ports 520, 522. The virtual functions 524, 526, 528, 530 may reconfigure the number and capabilities of the individual physical function 516, 518 within the SR-IOV adapter 508.

Figure 6:
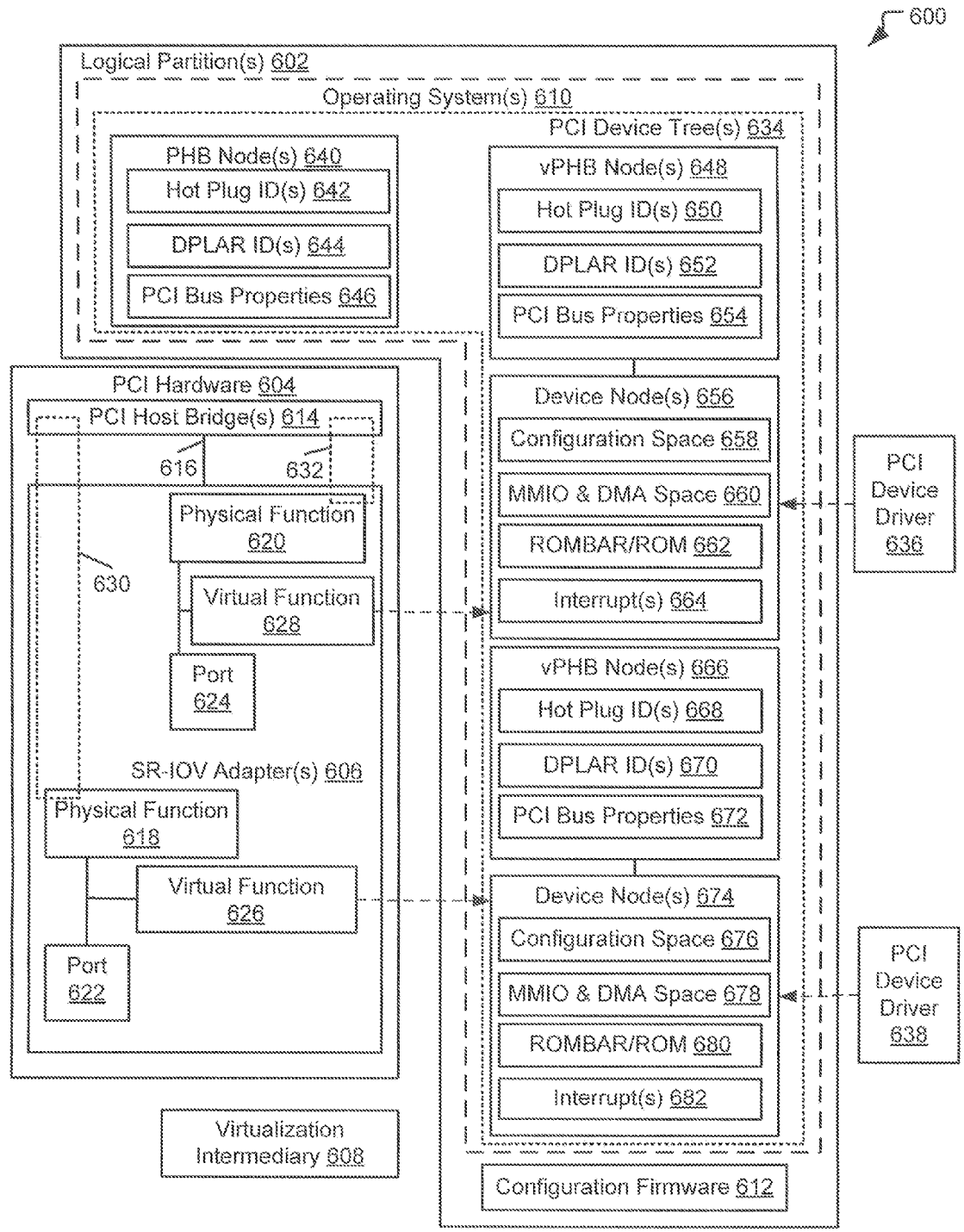
FIG. 6 is a block diagram of an embodiment of a system having an operating system that manages elements of a shared adapter by mapping an SR-IOV function to an emulated PCI-standard function to enable.

FIG. 6 shows a block diagram of an embodiment of a logically partitioned computing system 600 having an logical partition 602 configured to manage elements of computer system hardware 604, including an SR-IOV adapter 606. The SR-IOV adapter 606 may be non-shared, in that it is assigned to single logical partition 602. The logical partition 602 may include an operating system 610 and configuration firmware 612. The computing system 600 may include a virtualization intermediary 608 configured to automatically map an SR-IOV function to an emulated PCI-standard function to enable control by the logical partition 602 and/or the operating system 610.

The computer system hardware 604 may include a PCI host bridge (PHB) 614 coupled to the SR-IOV adapter 606 via a PCIe link 616. A PCIe bus (not shown) may be logically superimposed on the PCIe link 616 to facilitate PCI bus transactions between the PCI host bridge 614 and the SR-IOV adapter 606.

The SR-IOV adapter 606 may include physical functions (PFs) 618, 620 that are respectively coupled to ports 622 and 624. The SR-IOV adapter 508 may further include a virtual function (VF) 626 associated with the physical function 618, and a virtual function 628 associated with the physical function 620. As shown in FIG. 6 in broken lines, blocks 630 and 632 represent virtual PCI host bridge domains.

The operating system 610 may include a PCI device tree 634 and multiple PCI virtual function device drivers 636, 638. The PCI device tree 634 may include a PCI host bridge node 640. The PCI host bridge node 640 may be associated with the PCI host bridge 614. The PCI host bridge node 640 may include a hot plug ID 642, a DLPAR ID 644, and PCI bus properties 646.

A virtual PCI host bridge node 648 of the PCI device tree 634 may be associated with the virtual PCI host bridge domain 632. The virtual PCI host bridge node 648 may include a hot plug ID 650, a DLPAR ID 652, and PCI bus properties 654. The virtual PCI host bridge node 648 may be associated with a device node 656. The device node 656 may also be associated with the virtual function 628 and the PCI virtual function device driver 636. The device node 656 may include a configuration space 658, MIMIO and DMA space 660, PCI ROMBAR/ROM space 662, and interrupts 664.

A virtual PCI host bridge node 666 of the PCI device tree 634 may be associated with the virtual PCI host bridge domain 630. The virtual PCI host bridge node 666 may include a hot plug ID 668, a DLPAR ID 670, and PCI bus properties 672. The virtual PCI host bridge node 666 may be associated with a device node 674. The device node 674 may also be associated with the virtual function 626 and the PCI virtual function device driver 638. The device node 674 may include a configuration space 676, MIMIO and DMA space 678, PCI ROMBAR/ROM space 680, and interrupts 682.

The SR-IOV adapter 606 may present one or a plurality of the physical functions 618, 620 at the PCIe link 616 across a PCIe bus. The physical functions 618, 620 may respond to configuration read and write cycles. Alternatively, the SR-IOV adapter 606 may be designed according to PCI ARI configuration addressing. Each physical function 618, 620 may have a unique configuration function number. The ports 622, 624 may create a connection to an external peripheral I/O interconnect, such as Ethernet, Fiber Channel, or other peripheral device interconnects.

Each physical function 618, 620 may be further configured by the virtualization intermediary 608 into one or more of the virtual functions 626, 628. An embodiment of the virtualization intermediary 608 may include a program code within firmware of the computer system 600. Another embodiment of the virtualization intermediary 608 may be a hypervisor. The virtualization intermediary 608 may be a component of the computer system firmware or a type of operating system that is a host to the operating systems 610. Another embodiment of the virtualization intermediary 608 may be a PCI manager.

Each virtual function 626, 628 may provide a PCI device programming interface that may be controlled by PCI virtual function device drivers 636, 638. The PCI virtual function device drivers 636, 638 may control the virtual functions 626, 628 to perform I/O transactions through the ports 622, 624 on behalf of the operating system 610.

As discussed herein, the virtual functions 626, 628 may be created under the physical functions 618, 620, which may be associated with the ports 622, 624. The virtual functions 626, 628 may thus share the physical facilities of the ports 622, 624. The virtual functions 626, 628 may have a limited ability to perform I/O transactions through the ports 622, 624 and may affect the physical state of the port 622, 624. The virtual functions 626, 628 may reconfigure the number and capabilities of individual physical function 618, 620 within the SR-IOV adapter 606.

Each of the virtual functions 626, 628 may be assigned to a different logical partition to enable the logical partitions 602 to access and I/O transaction resources of the SR-IOV adapter 606 and the ports 622, 624. In another embodiment, the SR-IOV adapter 606 may be assigned to a single logical partition (e.g., and may not be shared by other logical partitions).

The computer system 600 may be configured with the single logical partition 602 and the associated operating system 610 so as to appear as a non-partitioned computer system. The PCI virtual function device driver 636 may be configured for a particular type of virtual function, regardless of whether the SR-IOV adapter 606 is shared, non-shared, owned by a single operating system 610, or is located in a logically partitioned computing system.

The configuration firmware 612 may determine the PCI hierarchy containing the SR-IOV adapter 606. Prior to that determination, the virtualization intermediary 608 may detect and configure the SR-IOV adapter to establish a virtual function 626, 628 for each of the physical ports 622, 624. For an illustrative SR-IOV adapter 606, the virtualization intermediary 608 may configure virtual functions 626, 628 to be in a one-to-one correspondence with each physical port 618, 620.

The SR-IOV adapter 606 may support different peripheral device protocols to concurrently access a physical port 618, 620. For example, the SR-IOV adapter 606 may be a converged network adapters configured to enable Ethernet and Fibre-Channel-Over-Ethernet (FCoE) protocols to simultaneously operate over a single physical port 618, 620.

The virtualization intermediary 608 may create a unique instance of a virtual function 626, 628 for each protocol and on each physical port 618, 620 configured to operate multiple protocols. For example, for an illustrative SR-IOV adapter having four physical ports and enabling two protocols (e.g., Ethernet and FCoE), the virtualization intermediary 608 may configure two virtual functions on each physical port, for a total of eight virtual functions.

The virtualization intermediary 608 may provide the configuration firmware 612 with information to construct the PCI device tree 634 having the virtual PCI host bridge nodes 648, 666. The virtual PCI host bridge node 648 may correspond to the virtual function 628 of the SR-IOV adapter 606 assigned to the logical partition 602. Each virtual PCI host bridge node 648, 666 may be similar to the PCI host bridge node 418 of the device tree 416 in FIG. 3. Each virtual PCI host bridge node 648, 666 may be representative of the combined PCI bus and DLPAR domain properties of the PCI host bridge 614, the SR-IOV adapter 606, and the physical function 618, indicated as the virtual PCI host bridge domain 630.

The PCI bus properties 654 may be used by the virtualization intermediary 608 to address the virtual PCI host bridge domain 632. For instance, the virtualization intermediary 608 may translate PCI bus operations targeting the virtual PCI host bridge node 648. As such, the presence of the physical function 620 may be transparent to the operating system 610, as well as to the configuration firmware 612 of the logical partition 602.

The configuration firmware 612 may perform PCI hierarchy detection using PCI configuration read operations across the PCIe link 616. The configuration firmware 612 may thus detect the presence of a PCI function at various possible device addresses. For example, a function may be detected at function numbers 0 through 7, or alternatively at ARI function numbers 0 through 255 of an implied ARI device number.

The virtualization intermediary 608 may intercept PCI configuration read or write transactions to the PCIe link 616. The virtualization intermediary 608 may respond to a PCI bus configuration read operation such that the configuration firmware 612 first detects the virtual function 626 at an emulated function number 0 of the virtual PCI host bridge bus and device 0. The virtualization intermediary 608 may respond to the configuration firmware reads that are directed to only PCI device 0 and function 0 below the virtual PCI host bridge. The configuration firmware 612 may detect only a single PCI function, at function 0, in the PCI hierarchy below the virtual PCI host bridge. The virtual function 626 may thus be represented to the operating system 610 in a manner analogous to that of a PCI single function legacy adapter, such as the PCI adapter 408 of FIG. 4.

The virtualization intermediary 608 may pass configuration read operations directly to an actual virtual function configuration register within the SR-IOV adapter 606. The logical virtual PCI host bridge bus number and device function number may be translated to the actual PCI configuration bus/device/function number utilized on the physical PCI bus, or PCIe link 616.

In another embodiment, the virtualization intermediary 608 may respond directly to the configuration firmware read operations with an emulated register value. The virtualization intermediary 608 may have derived the emulated register value as part of configuring the SR-IOV adapter 606 in SR-IOV mode. This action may maintain the appearance of the virtual functions 626, 628 as single PCI function. The transparency of the physical functions 618, 620 on the virtual PCI host bridge bus may further be maintained with respect to the configuration firmware 612.

The configuration firmware 612 may also be modified from a legacy PCI function configuration to account for limitations of the PCI SR-IOV Architecture. The limitations may relate to the assignment of memory mapped address spaces associated with the virtual functions 626, 628. The configuration firmware 612 may write to the PCI base address registers of a PCI function to determine the size of the PCI memory space used by that base address register of that function. The configuration firmware 612 may select a location within PCI memory at which to bind the base address register and associated PCI memory space. However, the virtualization intermediary 608 may establish a location of the PCI memory regions to map virtual function PCI memory spaces using base address registers in the physical functions 618, 620.

According to the SR-IOV architecture, the virtual functions 626, 628 may not actually implement the PCI base address registers of a PCI function. As such, the PCI bus properties 654 of the virtual PCI host bridge node 648 may specify that the PCI base address registers are read only and cannot be changed in relation to their PCI memory location. As discussed herein, the PCI base address registers may belong to the device(s) on the PCI bus associated with the virtual PCI host bridge node 648.

In order for the configuration firmware 612 to determine the size of each PCI base address space within the virtual functions 626, 628, the configuration firmware 612 may perform the configuration write of all-ones data to each base address register. The virtualization intermediary 608 may emulate the action by storing temporary all-ones values. Where the configuration firmware 612 reads from the base address register, the virtualization intermediary 608 may return an emulated value of all-one bits. The emulated value may indicate the power of two size of the PCI memory space associated with the virtual function base address register. The virtual functions 626, 628 may then return the actual PCI address associated with that virtual function base address register for subsequent configuration reads from that virtual function base address register.

A legacy PCI function may be connected to a ROM device containing adapter vital product data or boot drivers used with that PCI function or adapter. The PCI function may include a ROMBAR that is subject to location within PCI memory by the configuration firmware 612. The virtualization intermediary 608 and configuration firmware 612 may perform the same sequence regarding the ROM base address register within the virtual function configuration space.

The operating system 610 may provide hot plug support. A hot plug module may enable a user to use an application interface within the operating system 610 to select a particular physical slot. The physical slot may include a PCI adapter for powering off or on. The hot plug module may enable the user to remove or add a PCI adapter without disrupting other functions of the computer system 600.

The PCI device tree 634 may be generated by the virtualization intermediary 608. The PCI host bridge node 640 of the PCI device tree 634 may represent the physical PCI host bridge 614 of the computer system hardware 604. The PCI host bridge node 640 may not include a PCI device within its hierarchy, but may include a hot plug ID 642. The operating system 610 may associate the hot plug ID 642 with a physical location of a PCIe slot. The PCIe slot may accommodate an adapter, such as the SR-IOV adapter 606, or a legacy, non-SRIVO PCIE adapter, in the same location connected to the PCIe link 616.

The hot plug ID 642 may be a logical ID that corresponds to a physical slot location or a power domain associated with the physical slot. The hot plug ID 642 may, itself, be the physical location ID, such as a system physical location code. Hot plug power operations may utilize the hot plug ID 642 to instruct the operating system 610 with the physical location of a power domain within the computer system hardware 604. The power domain may be the object of a power off or power on operation. The operating system 610 may use the hot plug ID 642 to determine PCI host bridges and PCI devices within the PCI device tree 634 that are affected by a power off or power on to the hot plug location.

An empty PCI slot may be assigned to a logical partition 602, and a PCI adapter may later be added to the PCI slot. The virtualization intermediary 608 may present the operating system 610 with the PCI host bridge node 640. The operating system 610 may use the PCI host bridge node 640 to identify the location of a hot plug power on operation. Such a hot plug power operation may add a PCIe adapter to a physical PCI host bridge 614.

While the adapter shown in FIG. 6 is an SR-IOV adapter, a hot plug operation of another embodiment may include a non-SR-IOV adapter having similar or the same connectivity and location possible. In a particular embodiment, a PCIe adapter may be connected to a PCI host bridge that is associated with a previously empty or powered-off slot. When the operating system performs a power-on of the PCIe adapter, the virtualization intermediary may determine whether the adapter is SR-IOV-capable. Where the adapter is a non-SR-IOV type of adapter, the virtualization intermediary may take no further action. The configuration firmware may detect a PCI device tree for the non-SR-IOV adapter with a device driver, as shown in FIG. 4. Where the adapter 606 is SR-IOV capable, the virtualization intermediary 608 may further determine whether the operating system 610 uses SR-IOV virtual function device drivers 636, 638 or a non-SR-IOV mode device driver.

According to a particular embodiment, the virtualization intermediary 608 determines that the operating system 610 does not use virtual function device drivers for the adapter 606. In such a scenario, the virtualization intermediary 608 may take no further action. As shown in FIG. 4, the configuration firmware 438 may detect a PCI device tree 416 for the adapter 406. Alternatively, the virtualization intermediary 608 may determine that the operating system 610 does use virtual function device drivers 636, 638 for the adapter 606. In response, the virtualization intermediary 608 may configure the adapter 606 as SR-IOV enabled with a single virtual function 626, 628 for each device protocol utilized on each port 622, 624.

The virtualization intermediary 608 may generate the PCI device tree 634 for the operating system 610. The operating system 610 may include the PCI host bridge node 640 and the virtual PCI host bridge node 648 for each virtual function 626, 628. The virtualization intermediary 608 may intercept PCI configuration cycles of the configuration firmware 612 to the PCI bus. The PCI bus may be associated with the PCI host bridge 614. The virtualization intermediary 608 may return that there are no devices present. For example, the PCI host bridge node 640 may have no associated device nodes 656. The configuration firmware 612 may detect a single PCI function at each PCI host bridge node 614 to generate a device node 656 for that associated virtual function. The configuration firmware 612 may further create an instance of a virtual function device driver 636, 638 in association with the device node 656.

An embodiment may enable the powering-off an adapter that is configured within a running logical partition 602. The power-off operation may allow repair or replacement of an adapter with an alternative adapter. The new adapter may be a different type than the original adapter.

The hot plug power off operation may use the hot plug ID 650 to identify a power domain containing a PCIE adapter. Accordingly, the hot plug ID 650 may enable the operating system 610 to identify all PCI hierarchies and devices within the shared hot plug domain represented by the physical slot location of the adapter 606.

Prior to performing the physical power off operation, the operating system 610 may determine all affected PCI devices by correlating the hot plug ID specified in the operation with the hot plug IDs 650, 668 in all virtual PCI host bridge nodes 648, 666. The operating system 610 may then terminate the operations of the device drivers 636, 638 associated with the device nodes 656, 674 under each virtual PCI host bridge node 648, 666 having that same hot plug ID 650, 668. Once the device drivers 636, 638 have terminated operations, the operating system 610 may continue with the physical power off operation of the hot plug domain associated with that hot plug ID 650, 668.

Where a PCIe slot containing an adapter has been powered off, it may be possible for the system user or a service representative to repair or replace the adapter. The replacement adapter may be a different type of adapter (e.g., replacing a PCIe adapter with an SR-IOV capable adapter or vice versa). In either case, a subsequent power-on of the PCIe slot may result in the virtualization intermediary 608 presenting the operating system 610 with an updated PCI device tree 634. The operating system 610 may use the SR-IOV virtual function device drivers 636, 638, along with virtual PCI host bridge nodes 648, 666 for each of the SR-IOV virtual functions 626, 628 that has been configured by the virtualization intermediary 608.

A PCI slot may be removed from or added to the control of a particular running logical partition 602. A PCI adapter may be removed from a logical partition to transfer that adapter to another logical partition during a dynamic logical partitioning (DLPAR) operation. DLPAR operations may reference a PCIE adapter. For example, the PCIE slot location within the computer system 600 may be referenced using a DLPAR ID 652, 670.

According to an embodiment, a PCIe slot associated with the PCI host bridge 614 may not be assigned initially to the logical partition 602 at the time that the logical partition 602 is booted. Adding the PCIe slot to the logical partition 602 may result in the virtualization intermediary 608 adding a PCI host bridge node 640, 674 to the PCIE device tree 634. Where the adapter is a non-SR-IOV type, the virtualization intermediary 608 may take no further action. The configuration firmware 612 may detect the PCI device tree 634 for the adapter 606, as shown in FIG. 4.

Where the adapter 606 is SR-IOV capable, the virtualization intermediary 608 may determine whether the operating system 610 uses the SR-IOV virtual function device drivers 636, 638 as non-SR-IOV mode device drivers. Where the SR-IOV virtual function device drivers 636, 638 are not used, the virtualization intermediary 608 may take no further action, and the configuration firmware 612 may detect a PCI device tree for that adapter 606. Where the SR-IOV virtual function device drivers 636, 638 are alternatively used, the virtualization intermediary 608 may configure the adapter as SR-IOV enabled with a single virtual function 626, 628 for each device protocol utilized on each port 622, 624. The virtualization intermediary 608 may further generate the PCI device tree 634 for the operating system 610, as shown in FIG. 6. As discussed herein, the PCI device tree 634 may include the PCI host bridge node 640 and the virtual PCI host bridge nodes 648, 666 for each virtual function 626, 628.

The virtualization intermediary 608 may intercept the PCI configuration cycles of the configuration firmware 612 to the PCI bus associated with the PCI host bridge 614. The virtualization intermediary 608 may return that there are no devices present. The PCI host bridge node 614 may have no associated device nodes 656, 674. The configuration firmware 612 may then detect a single PCI function at each PCI host bridge node 648, 666 to generate a device node 656, 674 for the associated virtual function. The configuration firmware 612 may further create an instance of a virtual function device driver 636, 638 associated with the device node 656, 674.

According to an embodiment, no adapter may be physically plugged into a PCI slot that has been transferred to the running logical partition 602. A later hot plug power-on operation may add an adapter to the running logical partition 602. For example, the virtualization intermediary 608 may enable the operating system 610 to selectively use the adapter 606 according to a legacy or an SR-IOV configuration. Conversely, a user may initiate the automatic removal of the SR-IOV adapter 606 from the running logical partition 608. The DLPAR ID 652, 670 may be used by the operating system 610 of that logical partition 608 to identify all PCI hierarchies and devices that will be removed during the DLPAR operation.

As represented by the PCI device tree 634, the operating system 610, may determine the affected PCI devices prior to relinquishing control of the affected PCI devices. The operating system 610 may correlate the DLPR ID specified in the operation with the DLPAR IDs 652, 670 in all virtual PCI host bridge nodes 648, 666. The operating system 610 may then terminate the operations of the device drivers 636, 638 associated with the device nodes 656, 674 under each virtual PCI host bridge 648, 666 (e.g., having that same DLPAR ID 652, 670). Once all the device drivers 636, 638 have terminated operations, the slot may be assigned to another, different logical partition 602. The slot may alternatively be added back to the original logical partition 602.

According to a particular embodiment, an SR-IOV adapter may be plugged below a PCI bridge, such as a PCI bridge of a PCIe switch. The PCIe switch may form a PCIe link below a bridge that is analogous to the PCIe link 616. The virtual PCI host bridge 648, 666 may be presented to the logical partition configuration firmware 612. The PCI bus properties 646, 672 of the virtual PCI host bridge 648, 666 may account for properties of the physical PCI host bridge 614. Illustrative such properties may include PCI bus memory and DMA address ranges, as well as interrupt assignments.

According to a particular embodiment, the virtualization intermediary 608 may not configure the SR-IOV adapter 606 for SR-IOV mode. Alternatively, the virtualization intermediary 608 may enable the configuration firmware 612 to fully detect and control configuration functions of the SR-IOV adapter 606. As such, the configuration firmware 612 may, itself, configure the SR-IOV adapter 606 for SR-IOV mode. The configuration firmware 612 may function as a virtualization intermediary local to the logical partition 602. The local virtualization intermediary may make the SR-IOV aspects of the SR-IOV adapter 606 visible to elements of the logical partition 602, the operating system 610, the device tree 634, or the device drivers 636, 638.

Operations of an embodiment are not limited by whether or not the configuration firmware 612 enables SR-IOV mode within an SR-IOV adapter that has not been virtualized by a virtualization intermediary 608 external to the logical partition 602. Operability may further be independent of what by method the logical partition 602 represents the SR-IOV adapter 606 within its device tree 634 or enables device driver translations to the functions of the SR-IOV adapter 606.

The SR-IOV adapter 606 may be assigned to a single operating system within a logical partition that is non-shared. The system 600 of a particular embodiment may determine whether to configure the SR-IOV adapter 606 for SR-IOV mode based on a configuration file accessible to the virtualization intermediary 608 upon detecting that the adapter is SR-IOV-capable.

Figure 7:
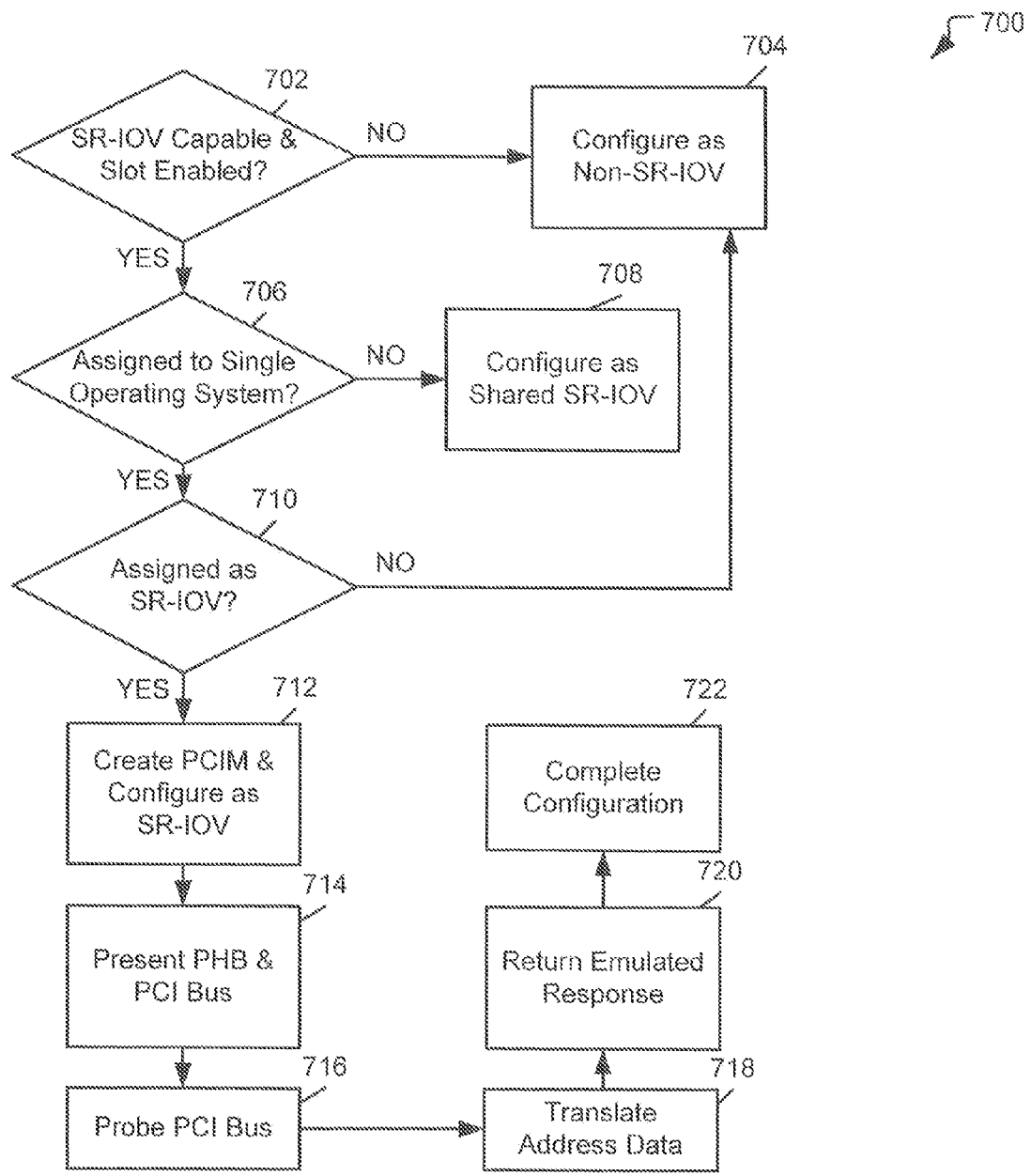
FIG. 7 is a flow diagram of an embodiment of a method of configuring an I/O adapter to be controlled by a single operating system instance or a logical partition of a computing system.

FIG. 7 is a flowchart of an embodiment of a method 700 of configuring an I/O adapter in a logically partitioned environment. A PCI adapter slot that includes an SR-IOV adapter may be controlled by a single operating system instance or a logical partition of a computing system. The PCI slot and the SR-IOV adapter may be assigned to a virtualization intermediary. The virtualization intermediary may determine whether the adapter is SR-IOV capable and whether the operating system desires or is capable of using the adapter as SR-IOV enabled. The adapter may be configured and enabled for SR-IOV with a subset of possible SR-IOV virtual functions. Control of virtual function PCI hierarchies may be transferred to the single operating system instance or a logical partition.

Turning more particularly to the flowchart, the virtualization intermediary may determine at 702 whether the adapter is SR-IOV capable. The virtualization intermediary may further determine whether the adapter slot is an SR-IOV enabled adapter slot. Put another way, the virtualization intermediary may determine whether the slot is capable of sharing an adapter, such as by virtue of providing physical facilities in the slot or PCI hierarchy above the slot to support sharing. Where adapter and the adapter slot are not SR-IOV capable, the logical partition firmware may configure the adapter at 704 in legacy (e.g., non-SR-IOV) mode.

Where adapter or the adapter slot are alternatively SR-IOV capable, the virtualization intermediary may determine at 706 whether the adapter slot is assigned to a single operating system. Being sharable, the adapter slot has the capability of being assigned to multiple operating systems. In another example, an adapter slot will be assigned by default to a single operating system in the case that the computer system is a single logical partition system without a management console. In the case that the adapter slot is not assigned to a single operating system, the virtualization intermediary may configure at 708 the adapter as a shared SR-IOV enabled adapter.

Where the adapter slot is alternatively assigned to a single operating system, the virtualization intermediary may determine at 710 whether the adapter is assigned a non-SR-IOV status. That is, the virtualization intermediary determines whether the adapter is intended to be used as non-SR-IOV. For instance, an operating system may have a full device driver for SR-IOV, but may desire to use the adapter in legacy mode. The determination may include referencing a profile associated with the logical partition. Where so, the logical partition firmware may configure the adapter at 704 in legacy mode.

Where the adapter is alternatively assigned to a single operating system and alternatively also assigned an SR-IOV status, the virtualization intermediary may create at 712 an adapter PCI manager (PCIM), or physical function manager, and may configure the adapter in SR-IOV mode. The configuration operation may include creating one virtual function per protocol for each port. This may be the minimum number of virtual functions to make the adapter completely usable.

At 714, the virtualization intermediary may present a PCI host bridge and a PCI bus to the logical partition firmware with an SR-IOV enabled property for each virtual function created, as described in relation to FIG. 6. The logical partition firmware may probe at 716 the PCI bus for a device0/function0 property. The virtualization intermediary may translate at 718 a logical partition firmware bus configuration (e.g., bus/device/function) to a first virtual function actual bus/device/function, or actual address of a newly created virtual function. The virtualization intermediary may return an emulated response at 720 to a probe of the virtual function header type register to indicate to the logical partition firmware that the virtual function is a single function device. The logical partition firmware then may proceed to complete configuration at 722 of other virtual PCI host bridges indicated in the PCI device tree. For all other PCI bus, device, and function numbers other than those corresponding to the first virtual function, on this virtual PCI host bridge, the virtualization intermediary may indicate "no function present."

Figure 8:
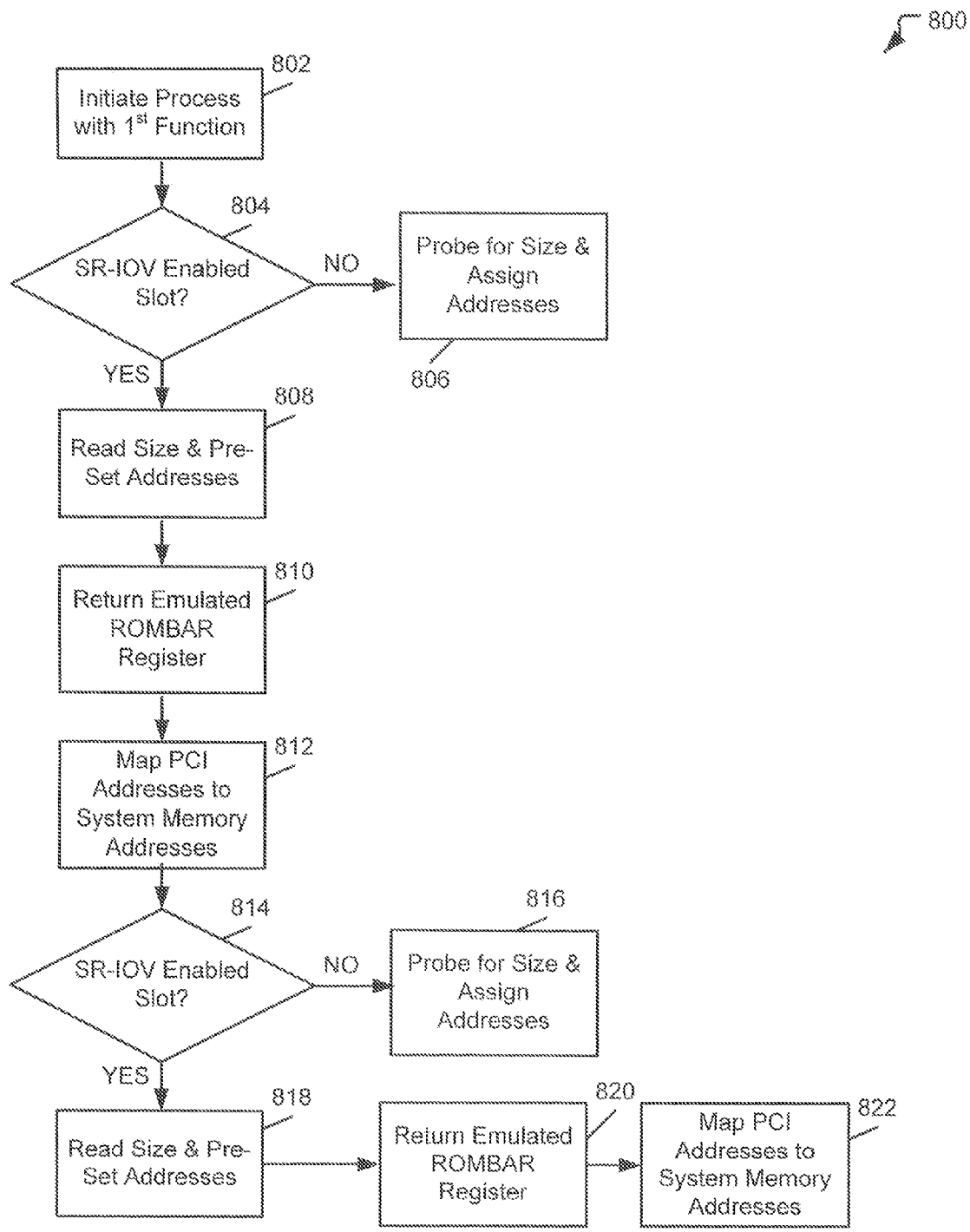
FIG. 8 is a flow diagram of an embodiment of a method of configuring a function of an adapter as executed by configuration firmware associated with a logical partition.

FIG. 8 shows an embodiment of a method of configuring a function of an adapter as executed by configuration firmware associated with a logical partition. At 802, the logical partition configuration firmware may initiate processes with a first function, e.g., function 0. The configuration firmware may determine at 804 whether the function is in an SR-IOV enabled adapter slot. Where the function is not in an SR-IOV enabled adapter slot, the configuration firmware may probe at 806 the ROMBARs 0-5 for size and may assign PCI memory addresses. The ROMBAR space may be emulated, including a map window having vital product data (e.g., serial number, part numbers) and an image of a device driver for booting.

Where the function is alternatively in an SR-IOV enabled adapter slot, the configuration firmware may read ROMBARs 0-5 for size and may pre-set PCI memory addresses. The virtualization intermediary may return emulated BAR information at 810. The configuration firmware may map at 812 the BAR PCI addresses to system memory addresses.

The configuration firmware may determine at 814 whether the function is in an SR-IOV enabled adapter slot. Where the function is not in an SR-IOV enabled adapter slot, the configuration firmware may probe at 816 the BARs 0-5 for size and may assign PCI memory addresses. Where the function is alternatively in an SR-IOV enabled adapter slot, the configuration firmware may read at 818 BARs 0-5 for size and may pre-set PCI memory addresses.

Figure 9:
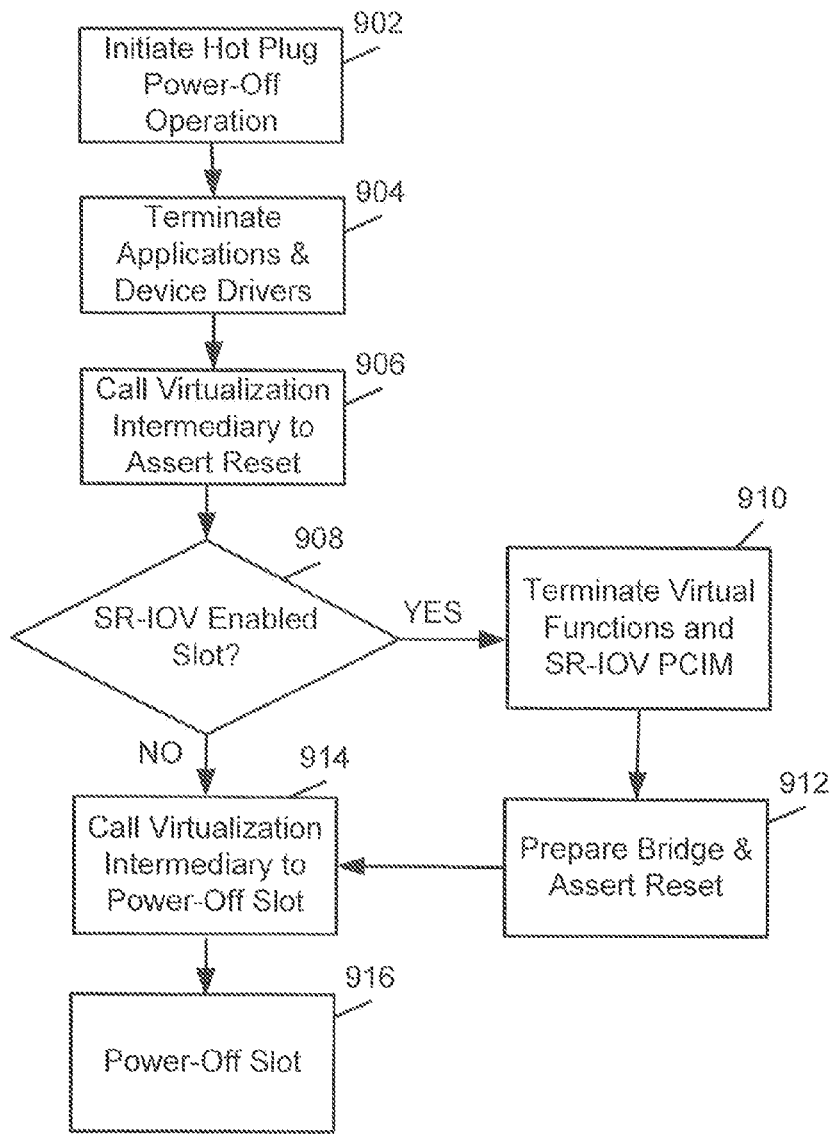
FIG. 9 is a flow diagram of an embodiment of a method of performing a hot plug power-off operation of an adapter slot having an I/O adapter.

The virtualization intermediary may return emulated BAR information at 820. The configuration firmware may map at 822 the BAR PCI addresses to system memory addresses. This feature may emulate addresses for control by the operating system. FIG. 9 is an embodiment of a method 900 of performing a hot plug power-off operation of an adapter slot having an adapter, such as the SR-IOV adapter of FIG. 3. A user may wish to conduct a power-off operation when desiring to add an adapter to an empty slot, or to replace or repair an adapter. Such an operation may be performed using an operating system that owns the physical slot, or using a management console where the physical slot is shared. Processes of an embodiment may be initiated or executed from an operating system user interface without using a management console.

At 902, a user may initiate an operating system hot plug power-off operation to a PCI slot from an operating system hot plug user interface. The operating system may terminate applications and device drivers at 904 for PCI devices in the slot hot plug power domain. The operating system may prompt the logical partition configuration firmware to call the virtualization intermediary at 906 to assert a PCI reset (e.g., PERST) to the adapter slot associated with the hot plug power domain ID of the physical PHB slot.

The virtualization intermediary may determine at 908 whether the adapter slot is SR-IOV enabled. Where the adapter slot is SR-IOV enabled, the virtualization intermediary may terminate at 910 the virtual functions and the SR-IOV PCIM (e.g., the physical function manager) for the adapter.

The virtualization intermediary may prepare at 912 the bridge for a power-off of the adapter slot and may assert a slot reset. The configuration firmware may call at 914 the virtualization intermediary to power-off the adapter slot associated with the hot plug domain ID of the physical PCI host bridge slot. The virtualization intermediary may power-off at 916 the adapter slot at a hot plug controller.

Figure 10:
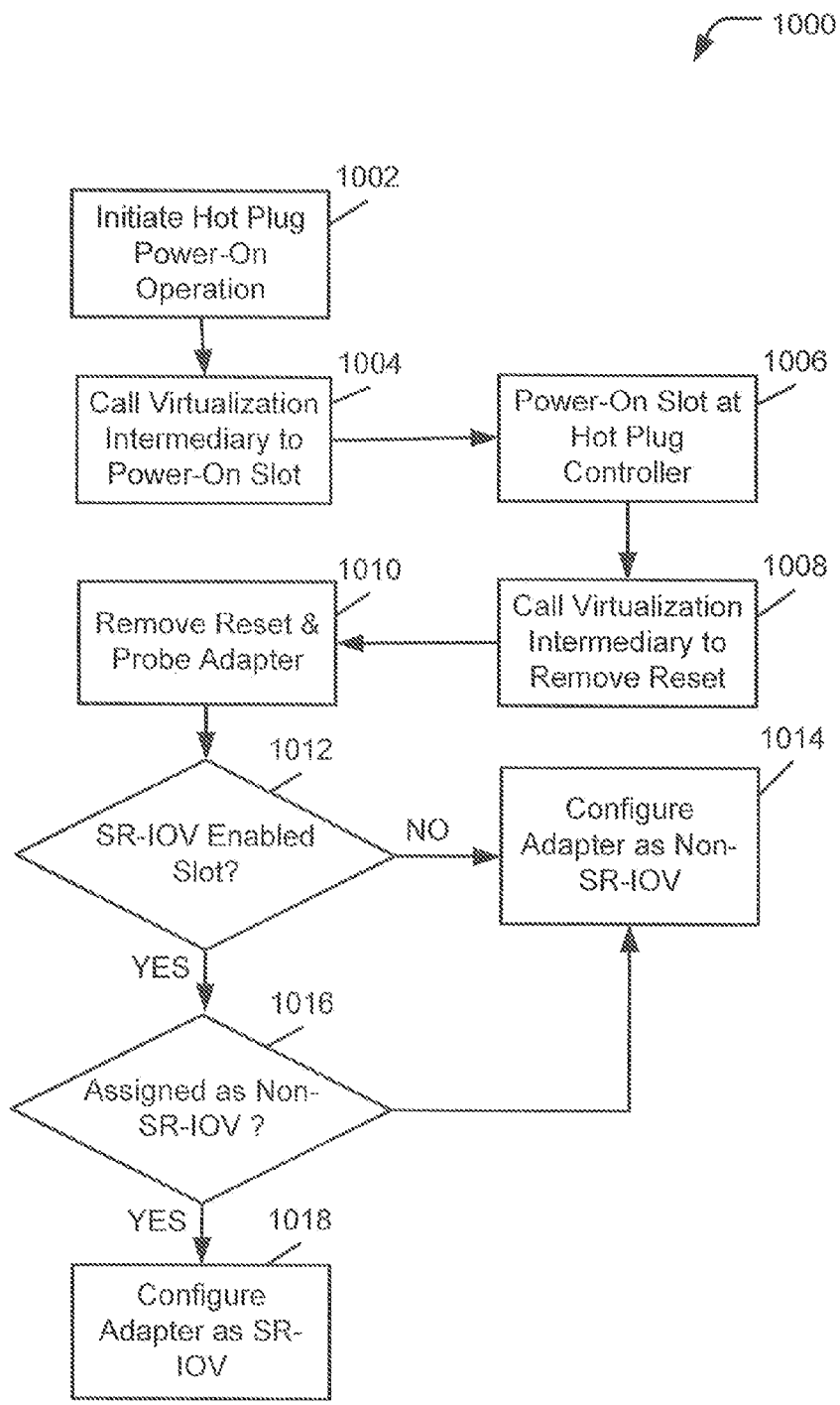
FIG. 10 is a flow diagram of an embodiment of a method of performing a hot plug power-on operation of an adapter slot having an I/O adapter.

FIG. 10 is an embodiment of a method 1,000 of performing a hot plug power-on operation of an adapter slot having an adapter, such as the SR-IOV adapter of FIG. 3. At 1,002, a user may insert an SR-IOV capable adapter into an SR-IOV enabled PCI slot. The user may initiate an operating system hot plug power-on operation to a PCI slot from an operating system hot plug user interface.

The logical partition configuration firmware may call at 1,004 the virtualization intermediary to power-on the adapter slot associated with the hot plug domain ID of physical PCI host bridge in the device tree. The virtualization intermediary may power-on at 1,006 the adapter slot at a hot plug controller. The hot plug controller may include a circuit that controls the power to the adapter slot.

The logical partition configuration firmware may call the virtualization intermediary to de-assert a reset status to the adapter slot associated with the physical PCI host bridge in the device tree, at 1,008. The virtualization intermediary may remove the PERST status at 1,010 and may probe the physical device 0/function 0 at the adapter.

The virtualization intermediary may determine at 1,012 whether the adapter is SR-IOV capable and is in an SR-IOV enabled slot. Where not, the configuration firmware may configure at 1,014 the adapter as a legacy non-SR-IOV adapter. Where the adapter is alternatively SR-IOV capable and is in an SR-IOV enabled slot, the virtualization intermediary may determine at 1,016 whether the adapter is assigned a non-SR-IOV status. Where the adapter is assigned a non-SR-IOV status, the configuration firmware may configure at 1,014 the adapter as a legacy non-SR-IOV adapter. Alternatively, the adapter may be configured for SR-IOV at 1,018, as described in the method 700 of FIG. 7.

Figure 11:
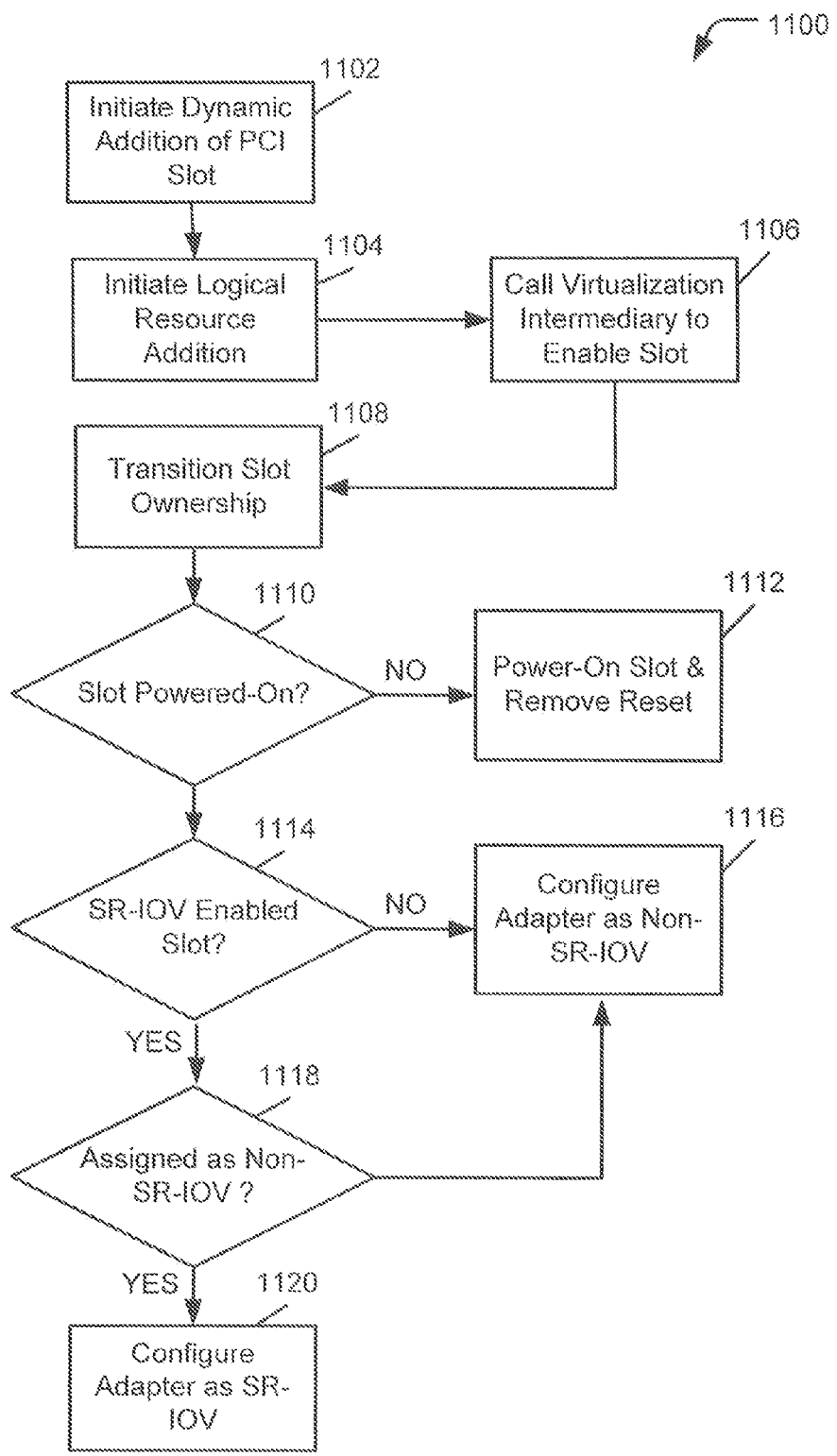
FIG. 11 is a flow diagram of an embodiment of a method of adding an I/O adapter to an empty adapter slot.

FIG. 11 is an embodiment of a method 1,100 of performing a PCI adapter addition to an empty adapter slot. A user may desire to associate functions of the PCI adapter to a running logical partition. At 1,102, a user may insert an SR-IOV capable adapter into an SR-IOV enabled PCI slot. The user may initiate a dynamic addition of a PCI slot to an active operating system from a management user interface.

The operating system may initiate at 1,104 a logical resource addition for a physical slot and an associated physical PCI host bridge. The logical partition configuration firmware may call at 1,106 the virtualization intermediary to enable the adapter slot in the operating system for the logical partition. The virtualization intermediary may transition at 1,108 the slot ownership to the logical partition and presents a physical slot PCI host bridge to logical partition to add to its device tree.

The virtualization intermediary may determine at 1,110 whether the adapter slot is powered-on. Where the adapter slot is not powered-on, the virtualization intermediary may power-on the adapter slot at 1,112 and may remove the PERST status. At 1,114, the virtualization intermediary may determine whether the adapter is SR-IOV capable and is in an SR-IOV enabled slot. Where not, the configuration firmware may configure at 1,116 the adapter as a legacy, non-SR-IOV adapter.

Where the adapter is alternatively SR-IOV capable and is in an SR-IOV enabled slot, the virtualization intermediary may determine at 1,118 whether the adapter is assigned a non-SR-IOV status. Where the adapter is assigned a non-SR-IOV status, the configuration firmware may configure at 1,116 the adapter as a legacy, non-SR-IOV adapter. Alternatively, the adapter may be configured for SR-IOV at 1,120, as described in the method 700 of FIG. 7.

Figure 12:
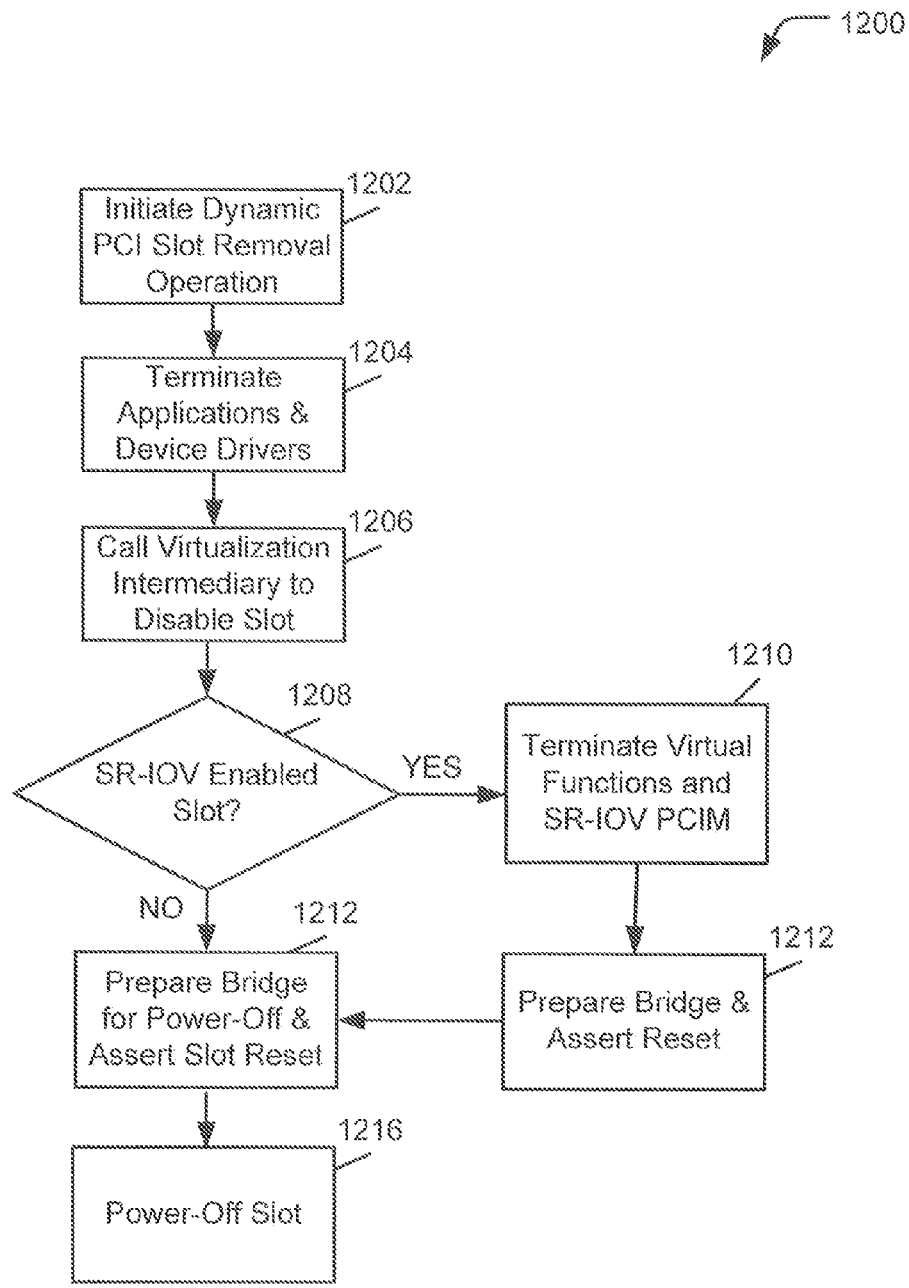
FIG. 12 is a flow diagram of an embodiment of a method of performing a PCI adapter slot removal.

FIG. 12 is an embodiment of a method 1,200 of performing a PCI adapter slot removal. At 1,202, a user may initiate a dynamic removal of a PCI adapter slot from an active operating system using a management user interface.

The operating system may terminate at 1,204 the applications and the device drivers for all PCI devices having the same DLPAR domain. The logical partition configuration firmware may call at 1,206 the virtualization intermediary to disable the DLPAR domain associated with that adapter slot in the operating system.

The virtualization intermediary may determine at 1,208 whether the adapter slot is SR-IOV enabled. Where the adapter slot is SR-IOV enabled, the virtualization intermediary may terminate at 1,210 the virtual functions and the SR-IOV PCIM for the adapter. The virtualization intermediary may prepare at 1,212 the bridge for power-off of the adapter slot and may assert a slot reset. Of note, the virtualization intermediary may transition slot ownership to the virtualization intermediary, itself. As such, the adapter slot may be available for transfer to another operating system or become a shared SR-IOV adapter slot.

A PCI adapter slot that includes an SR-IOV adapter may be controlled by a single operating system instance or a logical partition of a computing system. The PCI adapter slot may be controlled either by default on a non-partitioned system or where the PCI slot and the SR-IOV adapter are assigned to a logical partition of a logically partitioned computer. More particularly, the PCI slot and the SR-IOV adapter may be assigned to a virtualization intermediary, such as a hypervisor, a PCIM, a physical function manager, or system firmware.

A determination may be made as to whether the adapter is SR-IOV-capable and as to whether the operating system desires or is capable of using the adapter as SR-IOV enabled. The adapter may be configured and enabled for SR-IOV with a subset of possible SR-IOV virtual functions. Control of virtual function PCI hierarchies comprising virtual PCI host bridges each connecting a single function PCI device may be transferred to the single operating system instance or logical partition.

The virtualization intermediary may present the PCI adapter slot and PCI host bridge/root port hierarchy to the operating system as a PCI slot alike to other PCI slots. The virtualization intermediary may emulate the device in the slot as a PCI single function device detected at address device 0 and function 0, while the virtual intermediary itself addresses the VF at an alternate PCI device configuration address, including a non-zero function number in ARI mode. The logical partition may see the virtual function at device 0 function 0. ARI mode is therefore transparent and irrelevant to the logical partition, though the virtual function is actually addressed on the PCI bus with an ARI mode function number, or some other bus/device/function than what the virtualization intermediary emulates as the address known to the logical partition. The virtual functions of the SR-IOV adapter may be controlled by the operating system instance or the logical partition. There may be one virtual function per adapter protocol, per physical adapter port, or physical function.

The virtualization intermediary may present the PCI host bridge and the adapter slot to the operating system instance or the logical partition the same as for any PCI adapter slot including a non-SR-IOV adapter. The virtualization intermediary may present the virtual functions to the operating system as non-SR-IOV functions of a conventional PCI single-function device, identified as device 0 and function 0 connected to a PCI bus of a virtual PCI host bridge, in a 1:1 relationship. The virtualization intermediary may not expose the SR-IOV physical functions or the presence of other virtual functions sharing the same physical PCI bus. The virtualization intermediary/firmware may emulate virtual function BAR registers in the base PCI configuration space of each virtual function. The virtual functions may include values that the virtualization intermediary/firmware assigned in setting the virtual function's parent physical function SR-IOV capability virtual function BARs. The virtualization intermediary may present a ROMBAR that is mapped by a virtual function to enable the extraction of the adapter VPD and a (UEFI or FCODE) virtual function boot driver, and additional resources the virtualization intermediary/firmware. The virtual function may be operated within a logical partition and/or operating system as an individual function endpoint of a PCIe single function device.

The operating system may configure and manage the PCI hierarchy that includes PCI host bridges and PCI endpoint functions no differently than it would for a non-SR-IOV PCI single-function device that is connected to a PCI host bridge. This may be facilitated by the virtualization intermediary presenting each of the virtual functions as non-IOV single function devices each connected a virtualized PCI host bridge.

According to an embodiment, the virtualization intermediary or firmware may not configure the adapter in SR-IOV mode. Instead, the operating system may operate the adapter as a legacy PCI-Express adapter. Whether to configure the adapter for SR-IOV may be determined by an adapter profile registering the type, version, or capability of an operating system.

A particular embodiment may enable PCI hot plug operations on a PCI adapter slot that includes an SR-IOV adapter that is under the control of a single operating system instance or a logical partition. The operating system may associate the virtual functions with the PCI adapter hot plug domain in a manner identical to that for functions of a non-SR-IOV PCI multi-function adapter. For instance, the operating system may deactivate the virtual function device drivers and de-configure the PCI hierarchy associated with the PCI slot prior to performing a power off operation of the adapter.

During a hot plug power operation, the virtualization intermediary may determine that the adapter is SR-IOV-capable and that the operating system desires or is capable of using the adapter as SR-IOV-enabled. The virtualization intermediary may enable and configure the adapter for SR-IOV with a sufficient subset of possible SR-IOV virtual functions. Control of the collection of virtual PCI host bridge/root port and virtual function PCI hierarchies may be transferred to the logical partition or operating system. The virtualization intermediary may present the PCI adapter slot and PCI host bridge/root port hierarchy to the operating system as a PCI slot similar to other PCI slots, except that the operating system may be aware that the slot containing the PCI adapter is not configurable directly within the operating system, but has associated virtual resources. The subset of virtual functions may include one virtual function per adapter protocol, per physical adapter port, or physical function.

The virtualization intermediary may present the PCI host bridge/root port and adapter slot to the operating system and logical partition in the same manner as for any PCI adapter slot containing a non-SR-IOV adapter. The virtualization intermediary may further present the virtual functions to the operating system as non-SR-IOV functions of a conventional PCI single-function device, identified as device 0 and function. The virtualization intermediary may not expose the SR-IOV physical functions or expose other virtual functions sharing a common physical PCI host bridge. The virtualization intermediary may emulate virtual function BAR registers as RO BARs 0-5 in the base PCI configuration space of each virtual function having the values the virtualization intermediary/firmware assigned in setting the virtual function's parent physical function SR-IOV capability virtual function BARs. The virtualization intermediary may present a ROMBAR that is mapped RO by a virtual function to enable extraction of adapter VPD and a (UEFI or FCODE) virtual function boot driver to emulate and operate the virtual functions within a logical partition/operating system as an individual function endpoint of a PCIe single-function device.

The operating system may configure and manage the PCI hierarchy including the PCI host bridge/root port and virtual functions the same as for a non-SR-IOV PCI multi-function device connected to that PCI host bridge/root port by virtue of the virtualization intermediary presenting the virtual functions as non-IOV single-function devices each connected to a virtualized PCI host bridge. According to an embodiment, the virtualization intermediary does not configure the adapter in SR-IOV mode, and instead allows the operating system to operate the adapter as a legacy PCI-Express adapter. The configuration of the adapter may be determined by an adapter profile registering the type, and possibly an operating system version or capability.

During a hot plug power operation, the virtualization intermediary may not configure the adapter in SR-IOV mode and may alternatively allow the operating system to operate the adapter as a legacy PCI-Express adapter. The adapter slot that is the target of an operating system hot plug power-on operation may have been empty prior to the power-on operation. According to another embodiment, the targeted adapter slot of an operating system hot plug power-on may have been a slot occupied by a non-SR-IOV capable adapter that was powered off and replaced with an SR-IOV capable adapter prior to the power on operation.

According to another embodiment, the targeted adapter slot of an operating system hot plug power-on may have been a slot occupied by an SR-IOV capable adapter that was powered off and replaced with a different SR-IOV capable adapter prior to the power on operation. According to another embodiment, the targeted adapter slot of an operating system hot plug power-on may have been a slot occupied by an SR-IOV capable adapter that was powered off and replaced with another of the same type, or the very same, SR-IOV capable adapter prior to the power-on operation.

Another operation may add or remove assignments of logical partitions to a PCI adapter slot and an associated SR-IOV-capable adapter. An "add" assignment to a logical partition may result in the virtualization intermediary determining that the adapter is SR-IOV-capable and that the operating system desires or is capable of using the adapter in SR-IOV-enabled mode. The virtualization intermediary may enable and configure the adapter for SR-IOV with a sufficient subset of possible SR-IOV virtual functions.

The adapter slot containing the SR-IOV-enabled adapter may be an object of logical partition remove operation. A logical partition remove operation of an SR-IOV-enabled adapter from an operating system or a logical partition may result in the operating system associating the virtual functions with the PCI adapter hot plug domain in a manner identical to that for functions of non-SR-IOV PCI adapters sharing a common hot plug or a common DLPAR domain. The virtual function device drivers may be deactivated, and the PCI hierarchy associated with the PCI hot plug or DLPAR domain may be de-configured prior to performing the power off of the hot plug domain. A logical partition remove assignment of the SR-IOV-enabled adapter may result in the removal of the virtualization intermediary and related virtualization intermediary storage.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Use of the terms Peripheral Component Interconnect Express (PCIe) and Peripheral Component Interconnect (PCI) may be used interchangeably in some instances. Moreover, the terms operating system and logical partition may be used interchangeably in certain of the embodiments described herein. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of managing an adapter in a data processing system, the method comprising:
    assigning a peripheral component interconnect (PCI) slot and the adapter to a virtualization intermediary;
    determining, by the virtualization intermediary, whether the adapter is single root input/output virtualization (SR-IOV) capable;
    determining, by the virtualization intermediary, whether an adapter slot that includes the adapter is an SR-IOV enabled adapter slot for sharing the adapter slot;
    associating the adapter with a PCI hardware of a hardware server of the data processing system;
    assigning control of the adapter to an operating system within a logical partition of the data processing system, wherein the operating system includes a PCI device tree including a plurality of virtual PCI host bridge nodes, a plurality of PCI host bridge nodes and a plurality of device nodes, wherein each PCI host bridge node represents a respective PCI host bridge of the hardware server, and wherein each device node represents a respective instance of a virtual function of the adapter;
    determining whether the operating system is capable of using the adapter as SR-IOV enabled adapter by reading a configuration file by the virtualization intermediary;
    detecting a first virtual function of the adapter corresponding to a first physical function of the PCI hardware, wherein the first physical function includes a PCI memory space in a memory;
    in response to detecting the first virtual function, creating a first device node in the PCI device tree, wherein the first device node indicates at least one of a function or a property associated with the detected first virtual function, wherein the first device node is usable by the operating system to identify a first programming interface of the detected first virtual function;
    associating the created first device node with the detected first virtual function of the adapter;
    associating the created first device node with a first virtual PCI host bridge node in the PCI device tree;
    associating the fist virtual PCI host bridge node with a PCI host bridge domain, wherein the PCI host bridge domain facilitates communication with the detected first virtual function via the first virtual PCI host bridge node;
    establishing, in a memory, base address registers for mapping virtual function address registers to physical function address registers;

writing a value, by a configuration firmware, to a base address register of a first physical PCI function corresponding to the first virtual PCI function;
intercepting, by the virtualization intermediary, the writing of the value by the configuration firmware and storing in memory, by the virtualization intermediary, an emulated value;
intercepting, by the virtualization intermediary, a read by the configuration firmware;
in response to the intercepting of the read, returning, by the virtualization intermediary to the configuration firmware, the emulated value;
virtualization intermediary passes a configuration read operation to a virtual function configuration register within the adapter;
in response to the read operation, returning, by the first virtual function, the physical function base address register of the first physical function within the adapter in response by a call by the configuration firmware to the first virtual function; and
translating, the logical virtual PCI host bridge bus number and device function number to the physical PCI function number utilized on the physical PCI bus.

2. The method of claim 1, wherein detecting the first virtual function of the adapter is based on at least one of a port associated with the adapter and a protocol associated with the adapter.

3. The method of claim 1, further comprising:
generating a single root input/output virtualization (SR-IOV) function associated with the adapter;
correlating by a virtualization intermediary the SR-IOV function to a non-SR-IOV function of the operating system; and
using the operating system to modify an operational status of the adapter.

4. The method of claim 1, further comprising using a virtualization intermediary to correlate a single root input/output virtualization (SR-IOV)virtual function to the operating system as a non-SR-IOV function.

5. The method of claim 1, wherein the first device node further indicates at least one of a configuration space, a memory-mapped I/O (MIMIO) and direct memory access (DMA) space, a PCI read only memory base address register/read-only memory (ROMBAR/ROM) space, or an interrupt.

6. The method of claim 1, wherein a first PCI host bridge of the hardware server includes one of a hot plug identifier, a dynamic logical partitioning identifier, or PCI bus properties.

7. The method of claim 1, further comprising selectively configuring the adapter in at least one of a single root input/output virtualization (SR-IOV) mode and a non-SR-IOV mode.

8. The method of claim 1, further comprising correlating a hot plug identifier (ID) specified in a power off operation with hot plug ID of a PCI host bridge node.

9. The method of claim 1, further comprising determining whether an adapter slot that includes the adapter is assigned to the operating system.

10. The method of claim 1, wherein the first virtual PCI host bridge node includes a PCI bus property and a DLPAR domain property of the PCI host bridge, and wherein the PCI bus property is used by the virtualization intermediary to access the detected first virtual function through the virtual PCI host bridge domain.

11. An apparatus, comprising:
a processor;
a memory storing program code, the program code executable by the processor to:
assign control of an adapter associated with a hardware server to an operating system within a logical partition of a plurality of logical partitions of a data processing system, wherein the operating system includes a peripheral component interconnect (PCI) device tree including a plurality of PCI host bridge nodes and a plurality of device nodes, wherein each PCI host bridge node represents a respective PCI host bridge of the hardware server, and wherein each device node represents a respective instance of a virtual function of the adapter;
associate each of the PCI host bridge nodes with a PO host bridge domain;
detect a first virtual function of the adapter;
in response to detecting the first virtual function, create a first device node in the PCI device tree, wherein the first device node indicates at least one of functions or properties associated with the first virtual function, the first device node usable by the operating system to identify a first programming interface of the first virtual function;
detect a second virtual function of the adapter;
in response to detecting the second virtual function, create a second device node in the PCI device tree, wherein the second device node is usable by the operating system to identify a second programming interface of the second virtual function;
determining whether the adapter is single root input/output virtualization (SR-IOV) capable;
generate an SR-IOV function associated with the adapter;
correlate the SR-IOV function to a non-SR-IOV function of the operating system; and
using the operating system, modify an operational status of the adapter, wherein the operational status includes an assignment of the adapter to at least one of the plurality of logical partitions and includes an assignment of the adapter to the operating system.

12. The apparatus of claim 11, wherein the first device node includes one of a configuration space, a memory-mapped I/O (MIMIO) space, a direct memory access (DMA) space, a PCI read only memory base address register/read-only memory (ROMBAR/ROM) space, or an interrupt.

13. The apparatus of claim 11, wherein the operational status includes at least one of a power-off operation and a power-on operation.

14. The apparatus of claim 11, wherein the processor is configured to execute the program code to generate a plurality of virtual functions associated with the adapter based on a number of ports associated with the adapter and a number of protocols associated with the adapter.

15. The apparatus of claim 11, wherein the processor is configured to execute the program code to determine whether the adapter is single root input/output virtualization (SR-IOV) capable.

16. The apparatus of claim 11, wherein a PCI host bridge node includes PCI bus properties, and wherein the PCI bus properties specify that PCI base address registers are read only.

17. A computer program product comprising a computer usable medium having computer usable program code embodied therewith, the computer usable program code executable by a processor to:

assign control of an adapter associated with a hardware server to an operating system within a logical partition of a data processing system, wherein the operating system includes a peripheral component interconnect (PCI) device tree including a plurality of PCI host bridge nodes and a plurality of device nodes, wherein each PCI host bridge node represents a respective PCI host bridge of the hardware server, and wherein each device node represents a respective instance of a virtual function of the adapter;

associate each of the PCI host bridge nodes with a PCI host bridge domain;

detect a first virtual function of the adapter;

in response to detecting the first virtual function of the adapter, create a first device node in the PCI device tree, wherein the first device node indicates at least one of functions or properties associated with the first virtual function, the first device node usable by the operating system to identify a first programming interface of the first virtual function;

detect a second virtual function of the adapter;

in response to detecting the second virtual function of the adapter, create a second device node in the PCI device tree, wherein the second device node is usable by the operating system to identify a second programming interface of the second virtual function detect a second virtual function of the adapter;

in response to detecting the second virtual function, create a second device node in the PCI device tree, wherein the second device node is usable by the operating system to identify a second programming interface of the second virtual function;

generate a single root input/output virtualization (SR-IOV) function associated with the adapter;

correlate the SR-IOV function to a non-SR-IOV function of the operating system; and using the operating system, modify an operational status of the adapter, wherein the operational status includes an assignment of the adapter to at least one of the plurality of logical partitions and includes an assignment of the adapter to the operating system.

* * * * *